US009930248B2

(12) United States Patent
Bayani

(10) Patent No.: US 9,930,248 B2
(45) Date of Patent: Mar. 27, 2018

(54) DIGITAL IMAGE CAPTURING DEVICE SYSTEM AND METHOD

(71) Applicant: Eman Bayani, Chicago, IL (US)

(72) Inventor: Eman Bayani, Chicago, IL (US)

( * ) Notice: Subject to any disclaimer, the term of this patent is extended or adjusted under 35 U.S.C. 154(b) by 0 days.

(21) Appl. No.: 15/353,508

(22) Filed: Nov. 16, 2016

(65) Prior Publication Data

US 2017/0142327 A1    May 18, 2017

Related U.S. Application Data

(60) Provisional application No. 62/256,621, filed on Nov. 17, 2015.

(51) Int. Cl.
*H04N 5/232* (2006.01)
*G06K 9/00* (2006.01)

(52) U.S. Cl.
CPC ..... *H04N 5/23216* (2013.01); *G06K 9/00221* (2013.01); *G06K 9/00234* (2013.01); *G06K 9/00268* (2013.01); *G06K 9/00664* (2013.01); *H04N 5/23219* (2013.01); *H04N 5/23293* (2013.01)

(58) Field of Classification Search
None
See application file for complete search history.

(56) References Cited

U.S. PATENT DOCUMENTS

| 8,520,093 | B2 | 8/2013 | Nanu et al. |
| 8,786,750 | B2 | 7/2014 | Kameyama et al. |
| 8,897,504 | B2 | 11/2014 | Steinberg et al. |
| 2011/0090359 | A1* | 4/2011 | Sagawa ................ G06K 9/3233 348/222.1 |
| 2014/0344744 | A1* | 11/2014 | Burt ........................ G06T 13/20 715/771 |

* cited by examiner

*Primary Examiner* — Mark T Monk

(57) ABSTRACT

A digital image capturing device configured to enable a user to capture and adjust an image of a scene, comprising of a display unit configured to display the image of the scene, a recognition module configured to recognize a plurality of regions in the scene, a microcontroller identifying the plurality of regions recognized by the recognition modules. The device setting options are provided in the display of the digital image capturing device independently to each recognized region of the plurality of regions in the scene. An options adjustment module and an area specific user interface module are provided in the display unit to provide options from the device setting options in close proximity to the identified plurality of regions in the image of the scene. The area specific adjustment user interface is configured to enable the user to make adjustments based on a selected device setting options.

19 Claims, 16 Drawing Sheets

DIGITAL IMAGE CAPTURING DEVICE SYSTEM AND METHOD

CROSS-REFERENCE TO RELATED APPLICATIONS

The present Utility patent application claims priority benefit of the U.S. provisional application for patent Ser. No. 62/256,621 entitled "MOBILE REAL TIME FACES TRACKING AND CONTROLS USER INTERFACE FOR CAMERA SYSTEM," filed on Nov. 17, 2015 under 35 U.S.C. 119(e). The contents of this related provisional application are incorporated herein by reference for all purposes to the extent that such subject matter is not inconsistent herewith or limiting hereof.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to an image capturing device. More particularly, the invention relates to a digital image capturing device with a designated feature that provides a user with enhanced controls while capturing images.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Variety of digital image capturing devices are available in the market. There is ongoing research in improving these devices particularly with a view to improve the quality and usability of the images captured. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that some image capturing devices may enable a user to provide images with good focus on desired elements in the images, for example, a face or an object. Some other image capturing devices may enable a user to provide images better picture quality i.e., with lesser noise and more clarity irrespective of the surroundings where the image is captured. Most of the images are captures with a purpose to capture memories, sharing with social circle, for security, and/or legal investigation purposes.

In view of the foregoing, it is clear that the traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
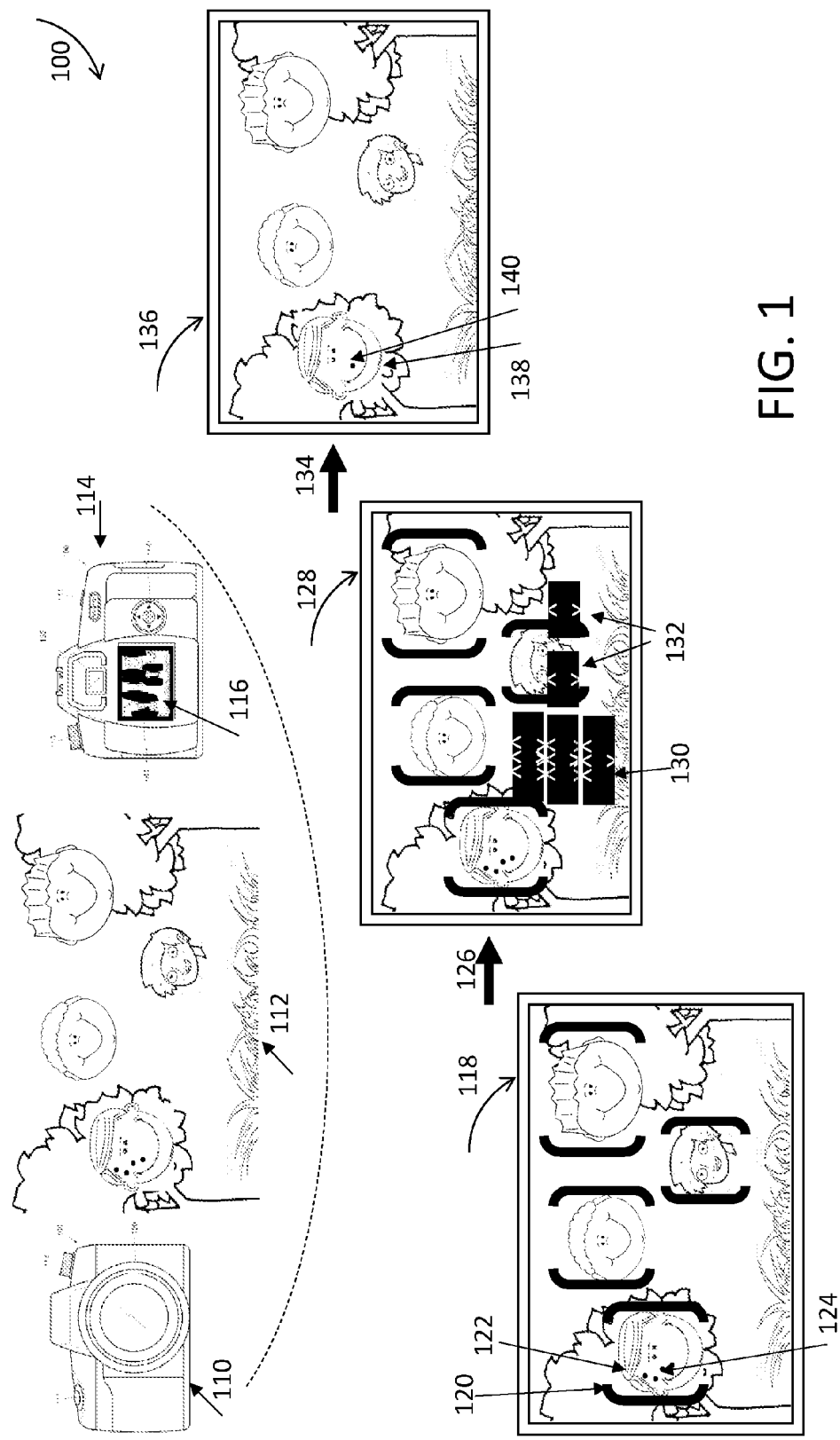
FIG. 1 illustrates an exemplary system using a digital image capturing device, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see *Ex parte Mallory,* 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye,* Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter.

To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.,* 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.,* 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.,* 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.,* 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon,* 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.,* 279 F.3d 1022 (Fed. Cir. 2002) (construing the terms "substantially constant" and "substantially below"); *Zodiac Pool Care, Inc.* v. *Hoffinger Indus., Inc.,* 206 F.3d 1408 (Fed. Cir. 2000) (construing the term "substantially inward"); *York Prods., Inc.* v. *Cent. Tractor Farm & Family Ctr.,* 99 F.3d 1568 (Fed. Cir. 1996) (construing the term "substantially the entire height thereof"); *Tex. Instruments Inc.* v. *Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek,* 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In *Andrew Corp.* v. *Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.,* 66 F.3d 1211, 1217, 36 USPQ2d 1225, 1229 (Fed. Cir. 1995); see, e.g., *Andrew Corp.* v. *Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially"

eliminated and for the intended purpose, it is believed that the slight portion of the film which may remain is negligible. We are of the view, therefore, that the claims may be regarded as sufficiently accurate." Similarly, In re *Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology

The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of" and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Firefox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM™ MQSeries™ technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiments of the present invention may provide means and/or methods for capturing images using a digital image capturing device. Some of these embodiments may comprise computer software. In some of these embodiments, software may be integrated into hardware, including, without limitation, uniquely-designed hardware for running embodiment software.

Herein, the phrase 'adjusted images' is used to denote various kinds of adjustments made to a captured image using the digital image capturing device, which may include, without limitation, the adjustments provided by the various settings in a digital image capturing device, for example, ISO—exposure, light, deleting regions, replacing portions of an image, etc. . . . .

FIG. 1 illustrates an exemplary system using a digital image capturing device, in accordance with an embodiment of the present invention. The system using a digital image capturing device 100 comprises at least a digital image capturing device 110. The digital image capturing device 110 is directed to a scene 112 for capturing an image of the scene 112 by a user (not shown in figure). The scene 112 is visible in the display 116 on side 114 of the digital image capturing device 110. The scene 112 is visible as a view 118 in the display 116. In one exemplary embodiment, the digital image capturing device 110 is capable of recognizing faces in scene 112 using a computer program in a computing system/microcontroller housed in the device. The face 122 is marked 120 with a bracket over the face as seen in view 118. The face 122 has a few black spots 124. The user is provided with multiple level of selection options as available in the digital image capturing device 100. The user is provided 126 with a selection option 130 (XXX) as seen in view 128 of the display 116. Once the user selects one of the options from 130 (XXX) the user is provided with a further set of detailed options 132 (XX) on the display 116 as seen in view 128. The selection options 130 and detailed options 132 are provided in close proximity to mark 122. The selection options 130 and detailed options 132 are provided using a computer program in a computing system housed in the device. For example, as shown in FIG. 1, the user selects an option to minimize the dark spots i.e., may be introduce a lightening effect on the face. The user selects an option 132 in the region of the spots 124. As a result, 134 in view 136 seen in display 116 only one spot 140 is viewable in the adjusted face image 138 compared to multiple spots 124 in the unadjusted face image 122.

It may be appreciated by a person with ordinary skill in the art, in light of and in accordance with the teachings of the present invention, a digital image capturing device 110 may be virtually any electronic device capable of capturing a digital image and having a display 116. Digital image capturing device 110 may be, but not limited to, digital cameras, for e.g., charge-couple device (CCD), complementary metal oxide silicon device (CMOS); web cameras; video cameras; smart phones or laptops or notepads or personal computers equipped with integrated digital cameras; etc. . . . . In another embodiment of the present invention, digital image capturing device 110 is a digital camera.

It may be appreciated by a person with ordinary skill in the art, in light of and in accordance with the teachings of the present invention, digital image capturing device 110 may connect to any number of devices with virtually any wired and/or wireless means. The digital image capturing device 110 may connect to virtually any device by means such as, but not limited to, Bluetooth connection, Ethernet cable, USB cable, WIFI, IRDA, etc. . . . . In one exemplary embodiment, the image captured on one digital image capturing device 110 may be shared with another digital image capturing device of system 100 to enable the user to make the adjustments to the image. In one exemplary embodiment, the image captured, analyzed, and adjusted on the digital image capturing device may be shared with virtually any device by means such as, but not limited to, Bluetooth connection, Ethernet cable, USB cable, WIFI, IRDA, etc. . . . . It may be appreciated by a person with ordinary skill in the art, in light of and in accordance with the teachings of the present invention, that digital cameras may typically have an application (computer program) that enables a user to transfer the image to be captured to a mobile phone to have a remote view or remote share, i.e., what is seen on the display 116 of the digital camera may be transferred to the display of a mobile phone and the user takes the pictures using the commands on the mobile phone. In this embodiment the adjustment options may be displayed on the screen of the mobile phone. In one embodiment, when the screen size is not big enough to display all/selected options for adjusting the image the device may have scroll up or down or right and left to view the options.

Figure 2:
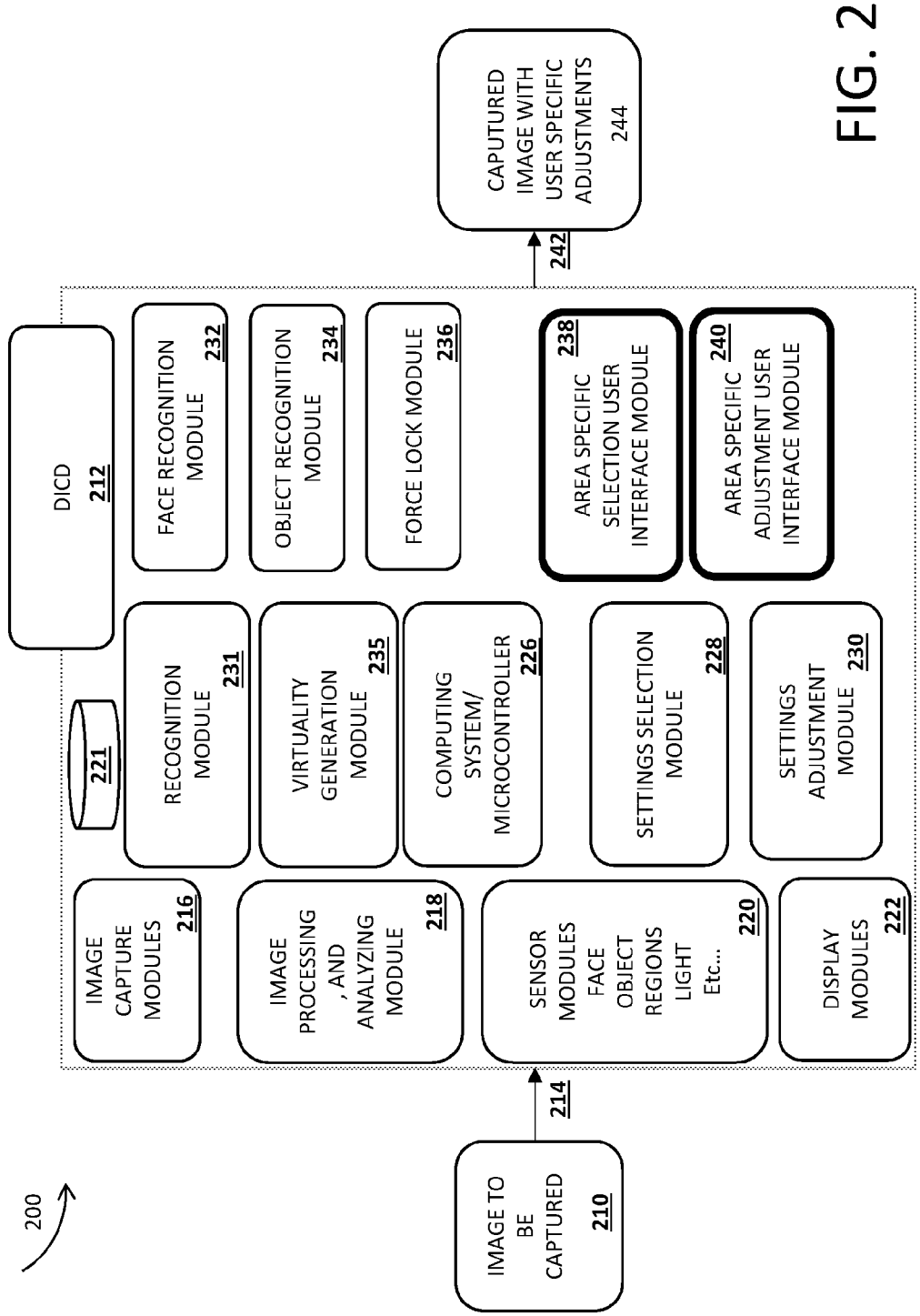
FIG. 2 illustrates an architecture of an exemplary system using a digital image capturing device, in accordance with an embodiment of the present invention.

FIG. 2 illustrates an architecture of an exemplary system using a digital image capturing device, in accordance with an embodiment of the present invention. A digital image capture device system architecture 200 may comprise a digital image capture device 212 which may include without limitation an image capture module 216, an image processing and analyzing module 218, a sensor module 220, a display module 222, a microcontroller 226, a recognition module 231, a face recognition module 232, an object recognition module 234, a force lock module 236, a virtual reality generation module 235, a settings selection module 228, a settings adjustment module 230, an area specific selection user interface module 238, and an area specific adjustment user interface module 240. An image capture module 216 may have a means of detecting and capturing an image, such as, without limitation, sensors and/or a processing unit, and displaying an image of an image to be captured 210. An image processing and analyzing module 218 may have a means of processing and analyzing an image, such as, without limitation, a processing unit, a computer to execute computer code and/or algorithms from a non-transitory computer readable medium for image processing and analyzing. A sensor module 220 may have a means of sensing an image and the ambient conditions, such as, without limitation, sensors and/or a processing unit, and assisting the image capture module to capture an image of the image to be captured 210. A microcontroller 226 may have a means of processing an image such as, without limitation, a processing unit, or a computer to execute computer code and/or algorithms from a non-transitory computer readable medium for image recognition. A recognition module 231 may have a means of processing an image such as, without limitation, a processing unit, or a computer to execute computer code and/or algorithms from a non-transitory computer readable medium for image recognition. A face recognition module 232 may have a means of processing an image such as, without limitation, a processing unit, or a computer to execute computer code and/or algorithms from a non-transitory computer readable medium for recognition of a face in an image of an image to be captured 210. The object recognition, by way of example and not limitation, may be a recognition module where it recognizes an virtual reality generation, an object character recognition, a biometrics, facial recognition (e.g., based on a facial biometrics), a hand gesture recognition, a social recognition, a voice/speech recognition, a thermal recognition, an iris recognition, a license plate recognition, a activity recognition, a pattern recognition, a handwriting recognition, a feature extraction recognition, a tracking recognition. The module may also include a similar means of recognizing the objects as listed above. The image of the image to be captured 210 may employ a biometrics module, a facial biometrics module, or a social recognition module, for example faces of people from social networking sites like Facebook, twitter, and the like, hand gestures module. Recognition module 231 may be configured with the capability of recognizing a fingerprint if it is in the region, or if iris recognition is in the region it will recognize, or if in the region thermal will be recognize. In some embodiments, if someone logs into the system with a finger reader then it recognizes them, yet in other embodiments Recognition module 231 may employ some or all of the above methods.

An object recognition module 234 may have a means of processing an image such as, without limitation, a processing unit or a computer to execute computer code and/or algorithms from a non-transitory computer readable medium for recognition of an object in an image of an image to be captured 210. The object recognition module may also include a similar means of recognizing the objects in the image of the image to be captured 210 using numbers or figures, object character recognition (OCR), etc. . . . . A force lock module 236 may have a means of processing an image such as, without limitation, a processing unit or a computer to execute computer code and/or algorithms from a non-transitory computer readable medium for force locking a region in an image of an image to be captured 210. The force locking may be exercised by the user on any part of the image of an image to be captured 210. A virtual reality generation module 235 may have a means of processing an image such as, without limitation, a processing unit or a computer to execute computer code and/or algorithms from a non-transitory computer readable medium designing a virtual reality of the image of an image to be captured 210. A setting selection module 228 may have a means of processing an image such as, without limitation, a processing unit or a computer to execute a designated computer code and/or algorithms from a non-transitory computer readable medium for providing the digital image capture device setting options in an image of an image to be captured 210. A setting adjustment module 230 may have a means of processing an image such as, without limitation, a processing unit or a computer to execute a designated computer code and/or algorithms from a non-transitory computer readable medium for providing the digital image capture device setting adjustment options in an image of an image to be captured 210. An area specific selection user interface module 238 may have a means of processing an image such as, without limitation, a processing unit or a computer to execute a designated computer code and/or algorithms from a non-transitory computer readable medium for providing the digital image capture device with an area specific selection user interface in an image of an image to be captured 210. An area specific adjustment user interface module 240 may have a means of processing an image such as, without limitation, a processing unit or a computer to execute a designated computer code and/or algorithms from a non-transitory computer readable medium for providing the digital image capture device with an area specific adjustment user interface in an image of an image to be captured 210.

The image processing and analyzing module, sensor module, recognition modules, settings selection and adjustment modules, and area specific setting and adjustment user interface modules may access one or more databases 221 as part of executing computer code and/or algorithms to, respectively, recognize an image and provide for processing, analyzing, sensing, recognizing, selecting and making adjustments to an image of the image to be captured 210. A display module 222 may have a means to display an image of an image to be captured 210 along with displaying the recognition of specific regions of the image and the user interface that displays settings to be used by a user to adjust/edit the image, such as, without limitation, a screen on a digital camera, to a user.

Figure 3:
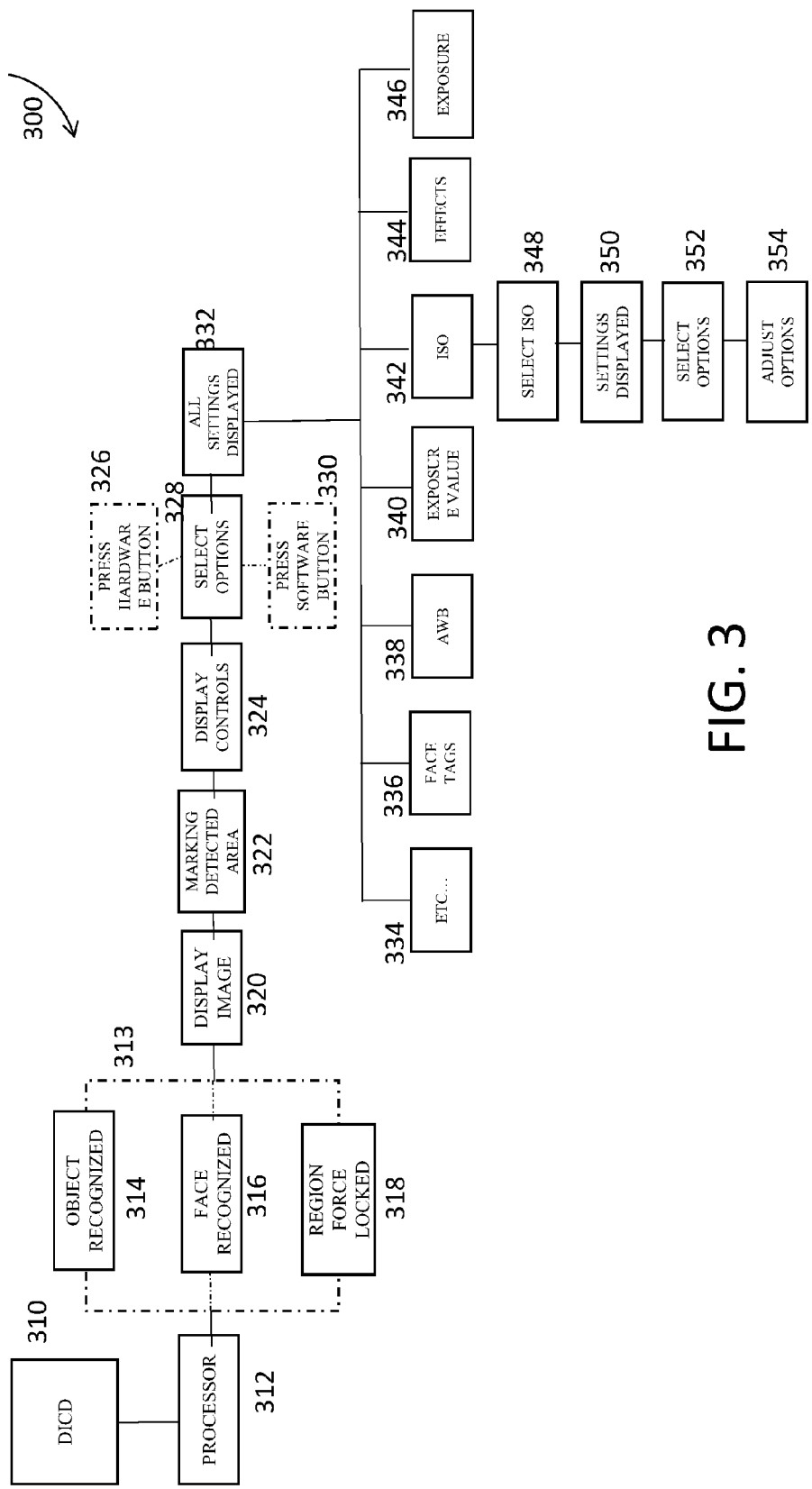
FIG. 3 is a block diagram illustrating an exemplary system for providing an adjusted image using a digital image capturing devices, in accordance with an embodiment of the present invention.

FIG. 3 is a block diagram illustrating an exemplary system for providing an adjusted image using a digital image capturing devices, in accordance with an embodiment of the present invention. During a typical operation of the system 300, a digital image capturing device (DICD) 310 is directed by a user (not shown in figure) to an image (not shown in figure). The image is captured by an image capturing module in the digital image capturing device. A processor 312 then works on processing and analyzing the image using various sensors (not shown in figure). A recognition module 313 then works on the processed and analyzed image. The system 300 includes specific recognition modules for detecting any object in the image and for any face in the image. The modules recognize and detect a face 316 or an object 314. In one embodiment, the recognition modules are on an auto function mode and may be triggered by a software algorithm in the event the digital image capturing device is directed to a scene for capturing an image of the scene. In another embodiment, the recognition modules are triggered by the user using a hardware in the digital image capturing device when the digital image capturing device is directed to a scene for capturing an image of the scene. In another embodiment, the user is provided with a user interface generated by a software or hardware on the display screen of the digital image capturing device for detecting and force locking 318 of a region in the image to be captured. In the embodiment, where the hardware is used by the user to trigger the recognition modules the digital image capturing device may provide the user with a visual or auditory signal to remind the user of such a feature available in the device. In one embodiment, the object and face recognition and force locking of a region in the image may be carried out independently of each other in a single image.

Once the image is processed, analyzed and portions recognized the image is displayed 320 in the display of the digital image capturing device 310. The recognized/force locked portions are identified by marking the detected area 322. It may be appreciated by a person with ordinary skill in the art, in light of and in accordance with the teachings of the present invention, that one or more methods of marking may be employed. The markings, without any limitation, may be done with an indicator of any shape or type circle, square, rectangle, bracket, etc. . . . . In one embodiment if a face, an object is auto-marked by the digital image capturing device, and the force locking of a region is initiated by the user, each of the face, the object, and the force locked region may be marked by the same indicator or with different indicators. The image with the markings is displayed on the display of the digital image capturing device.

The display of the digital image capturing device then displays the controls 324 in proximity to the detected areas using a designated computer program. It may be appreciated by a person with ordinary skill in the art, in light of and in accordance with the teachings of the present invention, and as described herein above that the controls may be displayed automatically by the device based on a software algorithm or by user using a hardware on the device that triggers the software algorithm. The user may then select options 328. It may be appreciated by a person with ordinary skill in the art, in light of and in accordance with the teachings of the present invention, and as described herein above that the user may select options either by using the user interface provided on the display 330 automatically by the device based on a software algorithm or by using hardware 326 on the device. All available camera settings are displayed 332 on the screen, for example, exposure 346, effects 344, ISO (image sensor sensitivity) 342, exposure value 340, AWB (auto white balance) 338, face tags 336, etc. . . . 334. On selecting 348 one of the settings say ISO 342, the user is provided with a display 350 of the next level of settings using a designated computer program, the user may then select 352 from the various options available under ISO 342, and then use one or more options to adjust 354 the image on the display of the device.

It may be appreciated by a person with ordinary skill in the art, in light of and in accordance with the teachings of the present invention, that one or more modules may be embodied in a single device. In an alternative embodiment of the present invention, all modules except the user interface setting and adjustment modules may be embodied in a first digital image capturing device which would be capable of taking a picture, processing and analyzing the image, and recognizing regions of the images. The user interface setting and adjustment modules may be embodied in a second device that is in communication with the digital image capturing device. In an embodiment, when the user triggers the interface in the second device the user interface may be displayed on the image in the display of the first device in proximity to the detected areas in the image. The user may then use the interface to make the necessary setting selections and adjustments to the image. In another embodiment, the user interface may be present in a remote device, for example, as an application (designated computer program as described hereinabove) in a mobile phone. The image of the image to be captured 210 may be displayed on the display of the mobile phone device, and may be called as remote view. The display on the mobile phone may be transmitted to the mobile phone from a device capable of at least viewing and capturing the image of the image to be captured using, for example Wi-Fi to the mobile phone. The designated computer program described hereinabove will be uploaded on the mobile phone with all its functionalities. The user interface, i.e., the controls for making option/detailed option selections may be displayed on the screen of the mobile phone. The user may use the user interface to make the necessary adjustments to the image.

It may be appreciated by a person with ordinary skill in the art, in light of and in accordance with the teachings of the present invention, a database 221 may be virtually any data storage device or devices. Database 221 may be, but not limited to, a plurality of data servers, a memory card. In another embodiment of the present invention, database 221 may be a memory card in a digital image capturing device 110.

It may be appreciated by a person with ordinary skill in the art, in light of and in accordance with the teachings of the present invention, that database 221 may contain virtually any data to improve the functionality of digital image capture device system 100. Database 221 may include, without limitation, photographs, clip arts, geotagging, compass data, audio, cached data, videos, app or programs to run, notes on facial data, and contacts.

It may be appreciated by a person with ordinary skill in the art, in light of and in accordance with the teachings of the present invention, that virtually any algorithm and/or computer code may be used to recognize an image on recognition module 231, face recognition module 232, object recognition module 234, and force lock module 236. Image recognition algorithms and/or methods may include, without limitation, Bayesian networks, fuzzy logic, neural networks, template matching, Hidden Markov models, machine learning, data mining, feature extraction and data analysis/statistics, optical character recognition, number recognition, biometrics, facial biometrics, social recognition, hand gesture recognition. In an alternative embodiment of the present invention, a binary search tree may be implemented to extract data from an image.

It may be appreciated by a person with ordinary skill in the art, in light of and in accordance with the teachings of the present invention, that there may be a plurality of the same modules in the digital image capturing device system architecture 200. A plurality of modules such as, without limitation, an image capture module 216, an image processing and analyzing module 218, a sensor module 220, a display module 222, a microcontroller 226, a recognition module 231, a face recognition module 232, an object recognition module 234, a force lock module 236, a settings selection module 228, a settings adjustment module 230, an area specific selection user interface module 238, and an area specific adjustment user interface module 240. The plurality of similar modules may work in parallel or independently to improve the throughput and/or speed of digital image capturing device system architecture 200.

It may be appreciated by a person with ordinary skill in the art, in light of and in accordance with the teachings of the present invention, that any module in digital image capturing device system architecture 200 may perform data manipulation. Data manipulation such as, but not limited to, compression, encryption, formatting. In an alternative embodiment of the present invention, any module sending data may first compress the data prior to data transmission.

Figure 4:
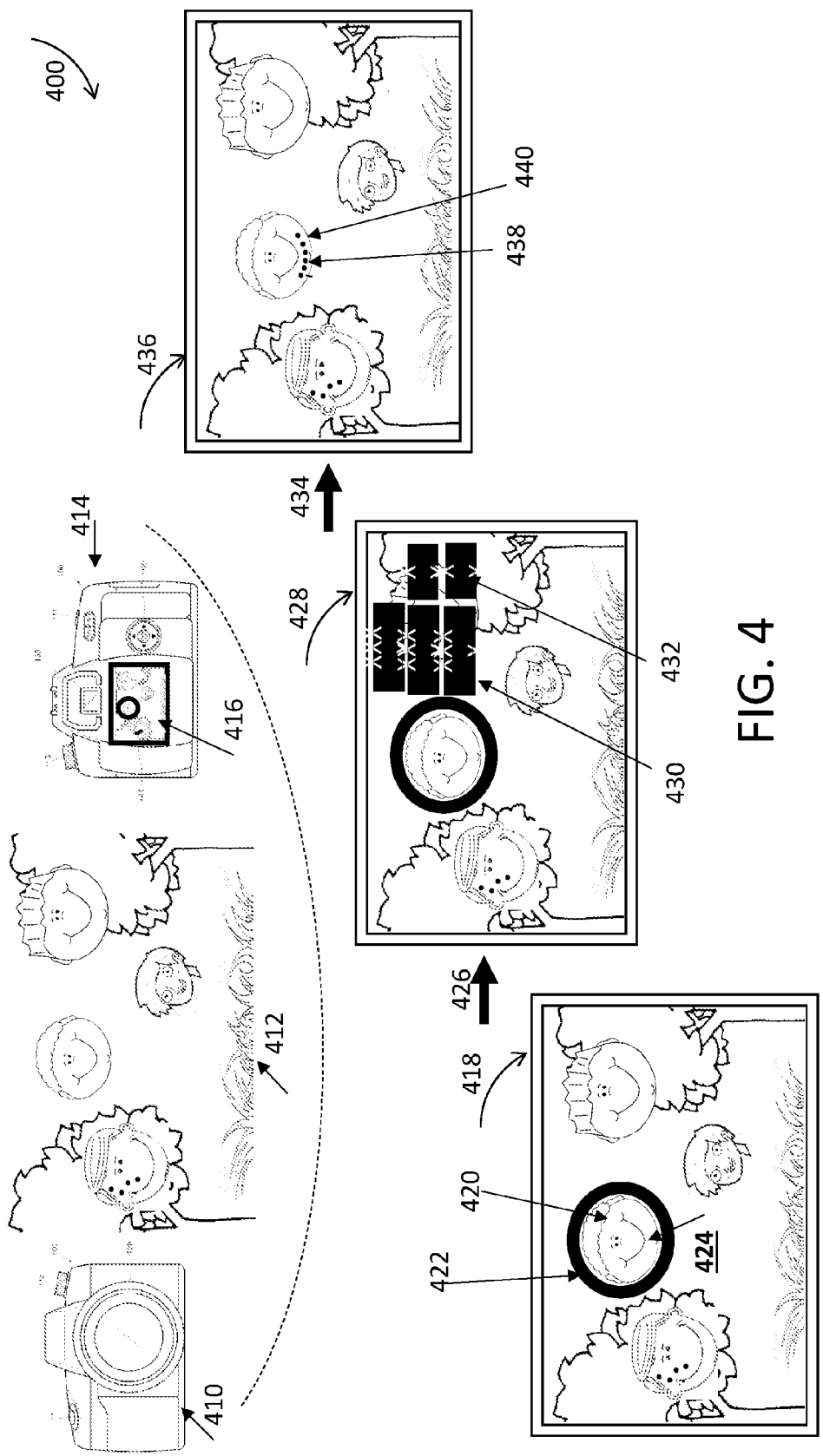
FIG. 4 illustrates an exemplary system using a digital image capturing device, in accordance with an embodiment of the present invention.

FIG. 4 illustrates an exemplary system using a digital image capturing device, in accordance with an embodiment of the present invention. The system using a digital image capturing device 400 comprises at least a digital image capturing device 410. The digital image capturing device 410 is directed to a scene 412 for capturing an image of the scene 412 by a user (not shown in figure). The scene 412 is visible in the display 416 on side 414 of the digital image capturing device 410. The scene 412 is visible as a view 418 in the display 416. In one exemplary embodiment, the digital image capturing device 410 is capable of recognizing faces in scene 412 using a computer program in a computing system/microcontroller housed in the device. The face 422 is marked 420 with a circle around the face as seen in view 418. The face 422 has a few black spots 124. The user is provided 426 with a selection option 430 as seen in view 428 of the display 416. Once the user selects one of the options from 430 (XXX) the user is provided a further set of detailed options 432 (XX) on the display 416 as seen in view 128. The selection options 430 and detailed options 432 are provided in close proximity to mark 422. The selection options 430 and detailed options 432 are provided using a computer program in a computing system housed in the device. For example, as shown in FIG. 4, the user selects an option to increase the grain size i.e., may be introduce a darkening effect on the face. The user selects an option 432 in the region of the spots 424. As a result, 434 in view 436 seen in display 416 a visual of a beard 440 is viewable in the adjusted face image 438 compared to a clean face 424 in the unadjusted face image 422.

Figure 5:
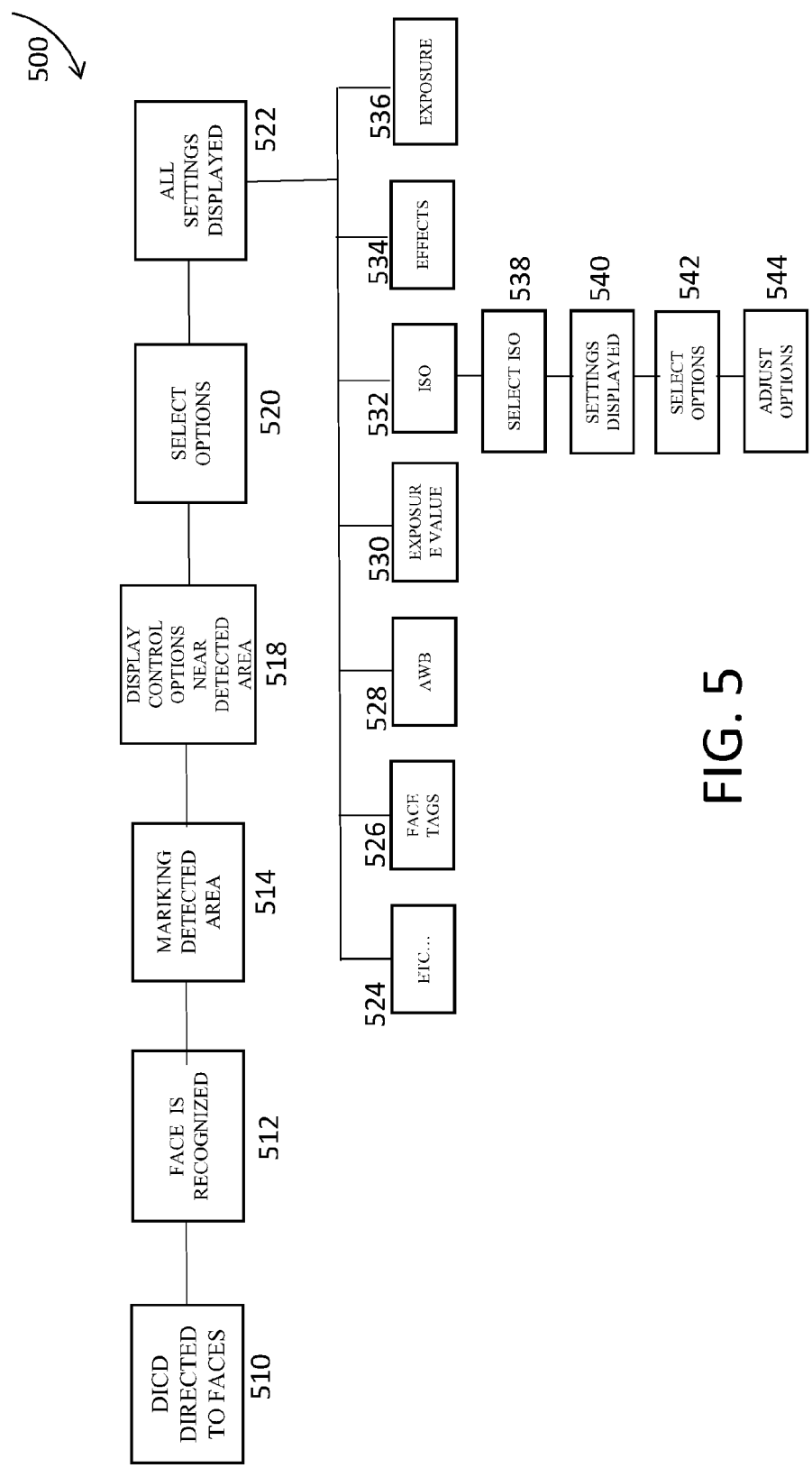
FIG. 5 is a block diagram illustrating an exemplary system for providing an adjusted image using a digital image capturing devices, in accordance with an embodiment of the present invention.

FIG. 5 is a block diagram illustrating an exemplary system for providing an adjusted image using a digital image capturing devices, in accordance with an embodiment of the present invention. During a typical operation of the system 500, a digital image capturing device (DICD) 510 is directed by a user (not shown in figure) to an image (not shown in figure). The image is captured by an image capturing module in the digital image capturing device. A processor (not shown in figure) then works on processing and analyzing the image using various sensors (not shown in figure). A face recognition module 512 then works on the processed and analyzed image. In one embodiment, the face recognition module may be on an auto function mode and may be triggered by a software algorithm in the event the digital image capturing device is directed to a scene for capturing an image of the scene. In another embodiment, the face recognition module may be triggered by the user using a hardware in the digital image capturing device when the digital image capturing device is directed to a scene for capturing an image of the scene. Once the image is processed, analyzed and the areas containing the faces are recognized, the faces are identified by marking the detected area containing the face 514. It may be appreciated by a person with ordinary skill in the art, in light of and in accordance with the teachings of the present invention, that one or more methods of marking may be employed. The markings, without any limitation, may be done with an indicator of any shape or type circle, square, rectangle, bracket etc. . . . . The image with the markings is displayed on the display of the digital image capturing device.

The display of the digital image capturing device then displays the controls 518 in proximity to the detected face. It may be appreciated by a person with ordinary skill in the art, in light of and in accordance with the teachings of the present invention, and as described herein above that the controls may be displayed automatically by the device based on a software algorithm or by user using a hardware on the device that triggers the software algorithm. The user may then select options 520. It may be appreciated by a person with ordinary skill in the art, in light of and in accordance with the teachings of the present invention, and as described hereinabove that the user may select options 520 either by using the user interface provided on the display automatically by the device based on a software algorithm or by using hardware on the device. All available camera settings are displayed 522 on the screen, for example, exposure 536, effects 534, ISO (image sensor sensitivity) 532, exposure value 530, AWB (auto white balance) 528, face tags 526, etc. . . . 524. On selecting 538 one of the settings say ISO 532, the user is provided with a display 540 of the next level of settings, the user may then select 542 from the various options available under ISO 532, and then use one or more options to adjust 544 the face on the display of the device as described with reference to FIG. 4. It may be appreciated by a person with ordinary skill in the art, in light of and in accordance with the teachings of the present invention, that the options 520 presented by a digital image capturing device may vary depending on the digital image capturing device used by the user. In one embodiment, when the digital image capturing device is a mobile phone, functions like more info, copy to clipboard, add tag, crop, detect text, set as, print, social share, location tags, effects, etc. . . . may be available to the user to make adjustments to the image of the scene being captured. In certain embodiments, the options/detailed options may include information about the detected area or histogram of the area in the image, etc. . . . .

Figure 6:
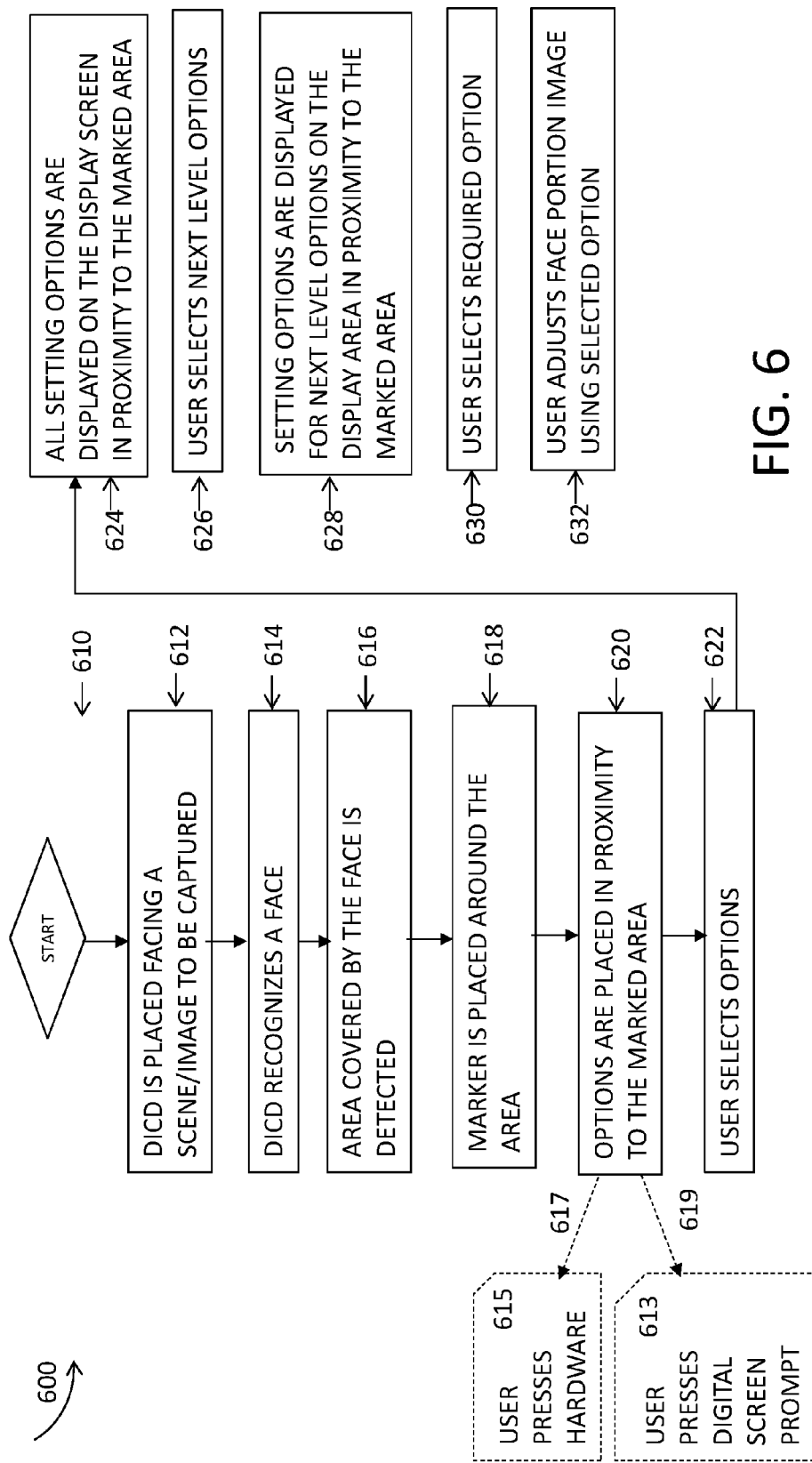
FIG. 6 is a flow chart illustrating an exemplary process for providing an adjusted image using a digital image capturing device, in accordance with an embodiment of the present invention.

FIG. 6 is a flow chart illustrating an exemplary process for providing an adjusted image using a digital image capturing device, in accordance with an embodiment of the present invention. After the start step 610 a user places a digital image capturing device facing a scene/image to be captured in step 612. The digital image capturing device is enabled to recognize a face(s) in the scene using a computer program. The area in the image covered by the face is detected in step 616. In step 618 a marker is placed around the area as described hereinabove. In step 620 a designated computer program provides a user interface on the display of the digital image capturing device that provides the user selection options that are placed in proximity to the marked area. The user either presses 617 hardware 615 or presses 619 digital screen prompt 613 to select the options. In step 622 the user selects the options. In step 624 all setting options are displayed on the display screen in proximity to the marked area as shown with reference to FIG. 5, for example, exposure 536, effects 534, ISO (image sensor sensitivity) 532, exposure value 530, AWB (auto white balance) 528, face tags 526, etc. . . . 524 in proximity to the marked area. In step 626 the user selects the next level of options, for example, options under ISO 532. In step 628, the user is provided with a display of options of the next level of settings, again in proximity to the marked area. In step 630 the user may select the required option, and then use one or more options to adjust 544 the face on the display of the device as described with reference to FIG. 4. In step 632, for example, as shown in FIG. 4 the user selects an option to increase the grain size in region 424 on the selected face 422 and adjusts the face portion accordingly.

It may be appreciated by a person with ordinary skill in the art, in light of and in accordance with the teachings of the present invention, that virtually any additional steps may be added to the digital image capture process 600. Additional steps may include, but not limited to, additional data gathering, sending messages to other devices, and accessing additional resources. In an alternative embodiment of the present invention, the digital image capture process 600 may include suggesting recommended image adjustments to a user before and/or after a user captures an image. As mentioned hereinabove, in various embodiments, the image adjustments suggested to the user may include the functionalities available in the digital image capture device being used by the user, for example, mobile phone, laptop, notebook, etc. . . . .

It may be appreciated by a person with ordinary skill in the art, in light of and in accordance with the teachings of the present invention, that one or more steps in the digital image capture process 600 may be added, removed, or rearranged. In some embodiments of the present invention, the digital image capture process 600 may omit the steps of. In other embodiments of the present invention, the order of steps in the digital image capture process 600 may occur in any order. In still other embodiments of the present invention, additional steps may be added to the digital image capture process 600.

Figure 7:
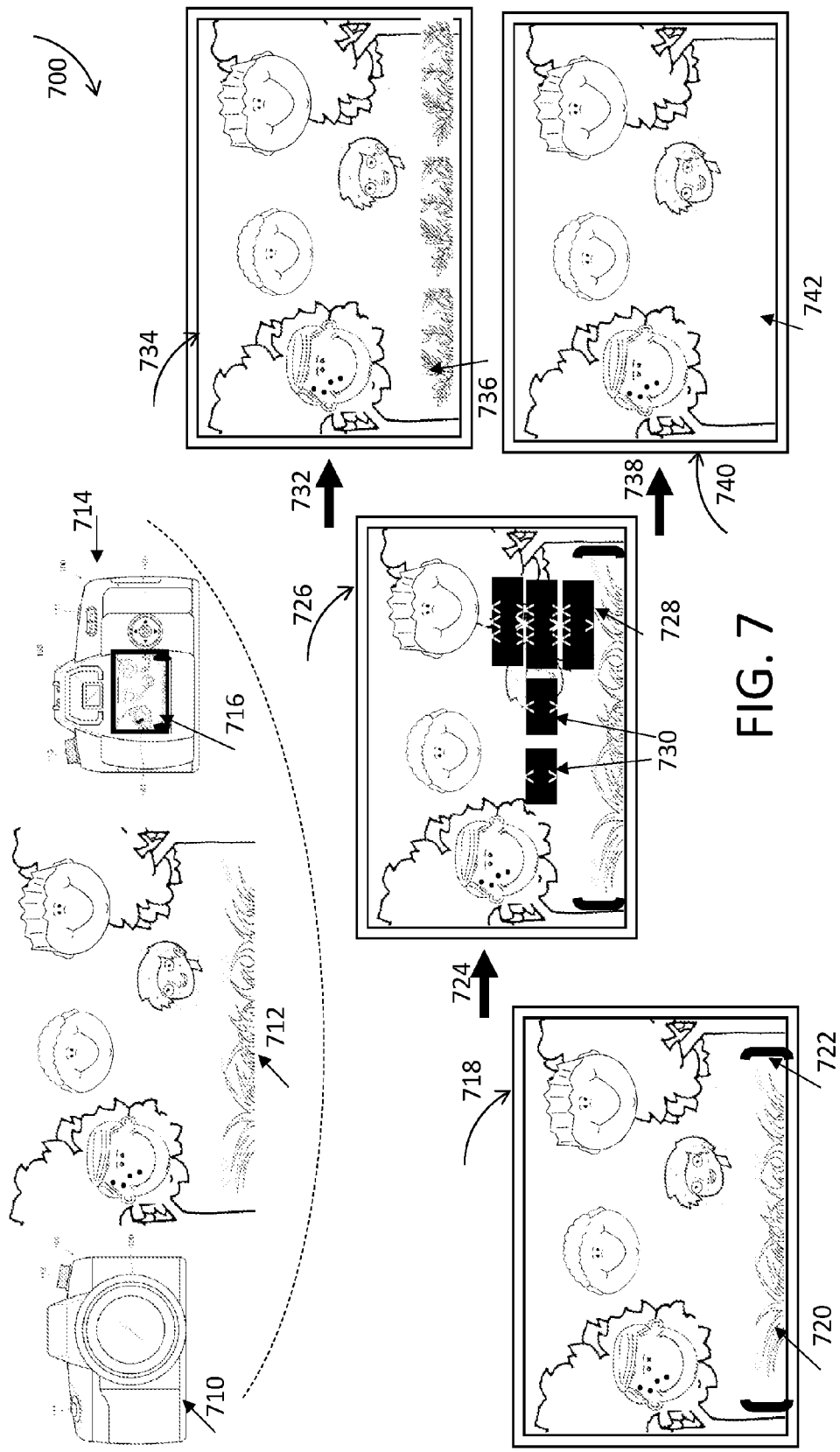
FIG. 7 illustrates an exemplary system using a digital image capturing device, in accordance with an embodiment of the present invention.

FIG. 7 illustrates an exemplary system using a digital image capturing device, in accordance with an embodiment of the present invention. The system using a digital image capturing device 700 comprises at least a digital image capturing device 710. The digital image capturing device 710 is directed to a scene 712 for capturing an image of the scene 712 by a user (not shown in figure). The scene 712 is visible in the display 716 on side 714 of the digital image capturing device 710. The scene 712 is visible as a view 718 in the display 716. In one exemplary embodiment, the digital image capturing device 710 is capable of recognizing objects in scene 712 using a computer program in a computing system/microcontroller housed in the device. The object 720, for example, grass, is marked 722 with a bracket around the object as seen in view 718. The user is provided 724 with a selection option 728 as seen in view 726 of the display 716. Once the user selects one of the options from 728 (XXX) the user is provided a further set of detailed options 730 (XX) on the display 716 as seen in view 726. The selection options 728 and detailed options 730 are provided in close proximity to mark 722. The selection options 728 and detailed options 730 are provided using a computer program in a computing system housed in the device. For example, as shown in FIG. 7, the user selects an option to delete the object 720 and replace it with object 736. As a result, 732 in view 734 seen in display 716 a visual of object 736 is viewable in place of object 720. In another example, as shown in FIG. 7, the user selects an option to delete the object 720. As a result, 738 in view 740 seen in display 716 a visual of a blank space 742 is viewable in place of object 720. It may be appreciated by a person with ordinary skill in the art, in light of and in accordance with the teachings of the present invention, that the image adjustments described in FIG. 7 may include other option selections, for example, but not limited to white balance; scene selection, i.e., landscape, night scene (night detection), high sensitivity, etc. . . . .

Figure 8:
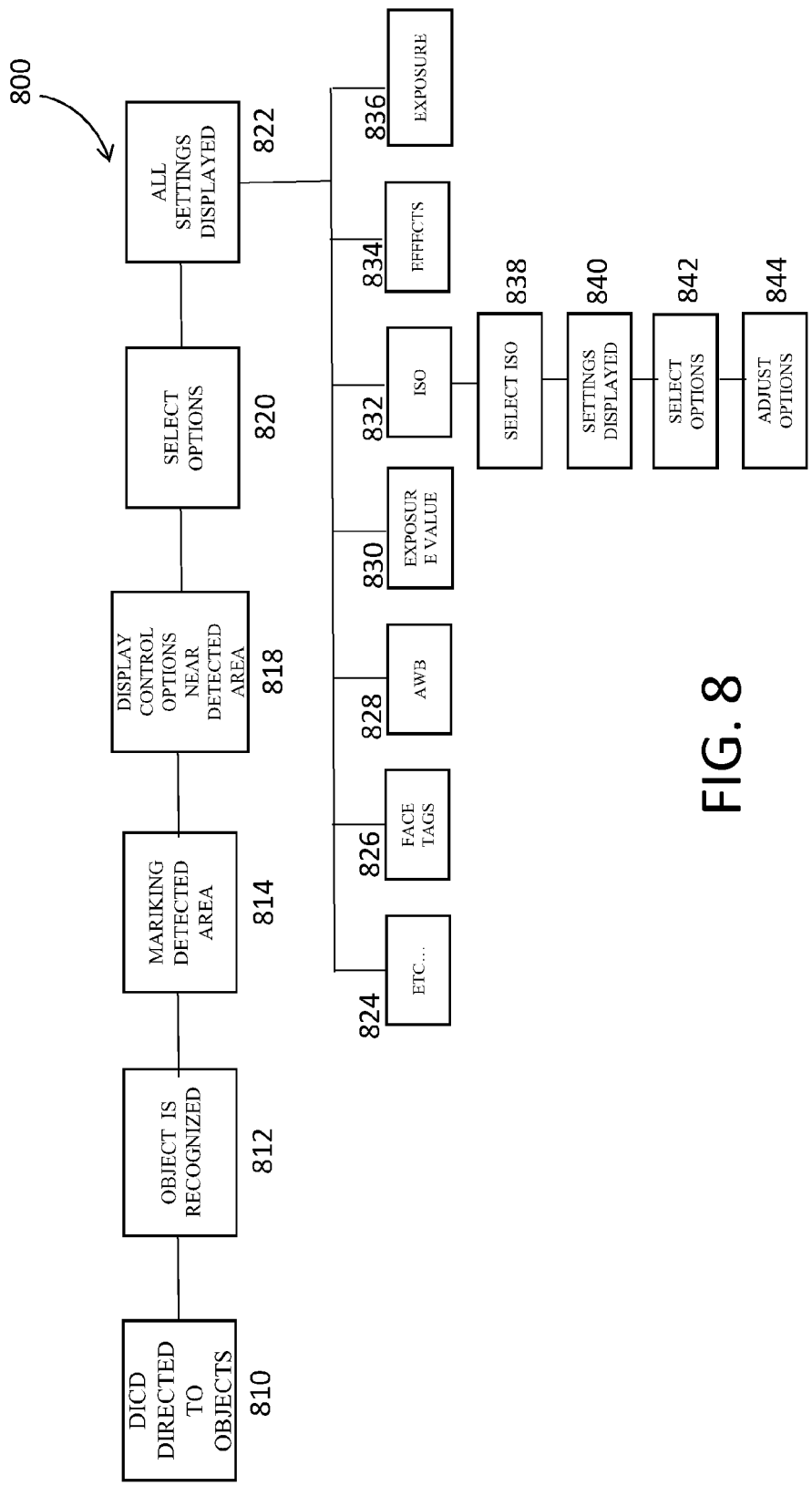
FIG. 8 is a block diagram illustrating an exemplary system for providing an adjusted image using a digital image capturing device, in accordance with an embodiment of the present invention.

FIG. 8 is a block diagram illustrating an exemplary system for providing an adjusted image using a digital image capturing devices, in accordance with an embodiment of the present invention. During a typical operation of the system 800, a digital image capturing device (DICD) 810 is directed by a user (not shown in figure) to an image (not shown in figure). The image is captured by an image capturing module in the digital image capturing device. A processor (not shown in figure) then works on processing and analyzing the image using various sensors (not shown in figure). An object recognition module 812 then works on the processed and analyzed image. In one embodiment, the object recognition module may be on an auto function mode and may be triggered by a software algorithm in the event the digital image capturing device is directed to a scene for capturing an image of the scene. In another embodiment, the object recognition module may be triggered by the user using a hardware in the digital image capturing device when the digital image capturing device is directed to a scene for capturing an image of the scene. In one embodiment, the scenes or regions or detected areas could have images captured for only that area. In this case, only the region around the area might be captured or picture of that area only could be captured. Hence, if the user just wants that area captured they could instruct to capture this area only.

Once the image is processed, analyzed and the areas containing the objects are recognized, the objects are identified by marking the detected area containing the objects 814. It may be appreciated by a person with ordinary skill in the art, in light of and in accordance with the teachings of the present invention, that one or more methods of marking may be employed. The markings, without any limitation, may be done with an indicator of any shape or type circle, square, rectangle, bracket etc. . . . . The image with the markings is displayed on the display of the digital image capturing device.

The display of the digital image capturing device then displays the controls 818 in proximity to the detected object. It may be appreciated by a person with ordinary skill in the art, in light of and in accordance with the teachings of the present invention, and as described hereinabove that the controls may be displayed automatically by the device based on a software algorithm or by user using a hardware on the device that triggers the software algorithm. The user may then select options 820. It may be appreciated by a person with ordinary skill in the art, in light of and in accordance with the teachings of the present invention, and as described hereinabove that the user may select options 820 either by using the user interface provided on the display automatically by the device based on a software algorithm or by using hardware on the device. All available camera or cellphone settings are displayed 822 on the screen, for example, exposure 836, effects 834, ISO (image sensor sensitivity) 832, exposure value 830, AWB (auto white balance) 828, face tags 826, etc. . . . 824. On selecting 838 one of the settings say ISO 832, the user is provided with a display 840 of the next level of settings, the user may then select 842 from the various options available under ISO 832, and then use one or more options to adjust 844 the object on the display of the device as described with reference to FIG. 7.

Figure 9:
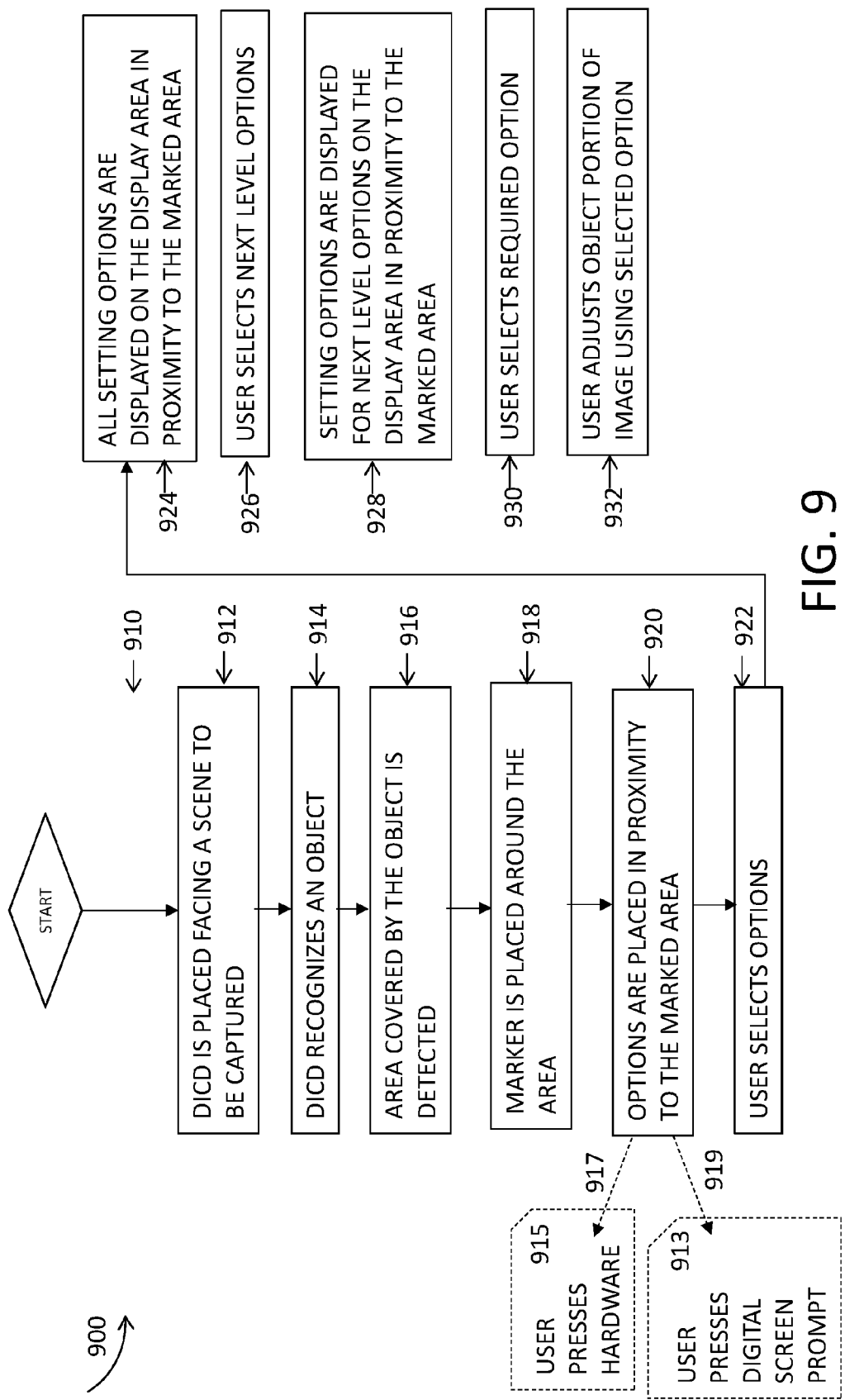
FIG. 9 is a flow chart illustrating an exemplary process for providing an adjusted image using a digital image capturing device, in accordance with an embodiment of the present invention.

FIG. 9 is a flow chart illustrating an exemplary process for providing an adjusted image using a digital image capturing device, in accordance with an embodiment of the present invention. After the start step 910 a user places a digital image capturing device facing a scene/image to be captured in step 912. The digital image capturing device is enabled to recognize an object(s) in the scene using a computer program. The area in the image covered by the object is detected in step 916. In step 918 a marker is placed around the area as described hereinabove. In step 920 a designated computer program provides a user interface on the display of the digital image capturing device that provides the user selection options that are placed in proximity to the marked area. The user either presses 917 hardware 915 or presses 919 digital screen prompt 913 to select the options. In step 922 the user selects the options. In step 924 all setting options are displayed on the display screen in proximity to the marked area as shown with reference to FIG. 8, for example, exposure 836, effects 834, ISO (image sensor sensitivity) 832, exposure value 830, AWB (auto white balance) 828, face tags 826, etc. . . . 824 in proximity to the marked area. In step 926 the user selects the next level of options, for example, options under ISO 832. In step 928, the user is provided with a display of options of the next level of settings, again in proximity to the marked area. In step 930 the user may select the required option, and then use one or more options to adjust 844 the face on the display of the device as described with reference to FIG. 7. In step 932, for example, as shown in FIG. 7 the user selects an option to replace the object in region 720 and delete it from the image as shown in view 740.

It may be appreciated by a person with ordinary skill in the art, in light of and in accordance with the teachings of the present invention, that virtually any additional steps may be added to the digital image capture process 900. Additional steps may include, but not limited to, additional data gathering, sending messages to other devices, and accessing additional resources. In an alternative embodiment of the present invention, the digital image capture process 900 may include suggesting recommended image adjustments to a user before and/or after a user captures an image. As mentioned hereinabove, in various embodiments, the image adjustments suggested to the user may include the functionalities available in the digital image capture device being used by the user, for example, mobile phone, laptop, notebook, etc. . . . .

It may be appreciated by a person with ordinary skill in the art, in light of and in accordance with the teachings of the present invention, that one or more steps in the digital image capture process 900 may be added, removed, or rearranged. In some embodiments of the present invention, the digital image capture process 900 may omit the steps of. In other embodiments of the present invention, the order of steps in the digital image capture process 900 may occur in any order. In still other embodiments of the present invention, additional steps may be added to the digital image capture process 900.

Figure 10:
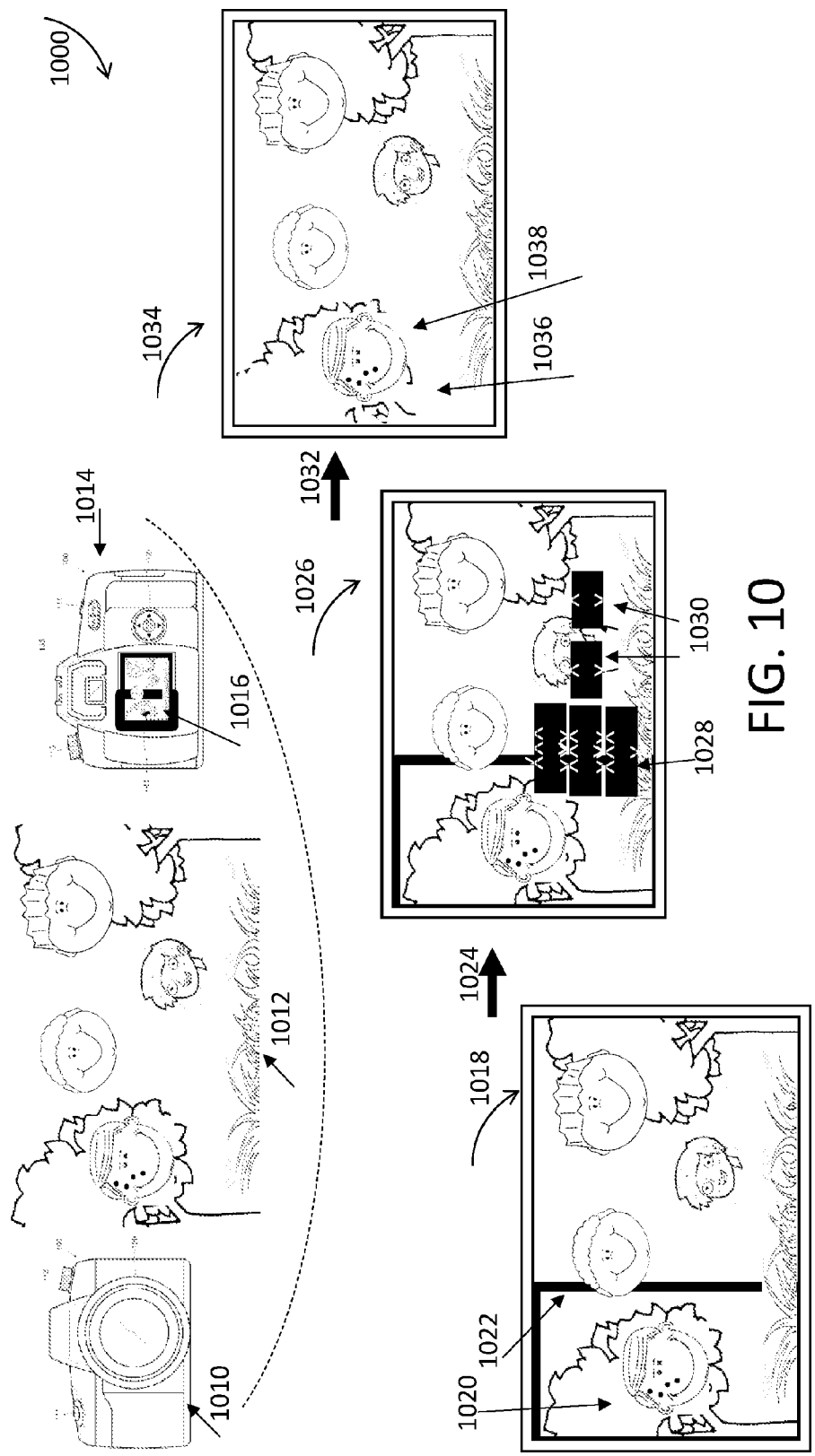
FIG. 10 illustrates an exemplary system using a digital image capturing device, in accordance with an embodiment of the present invention.

FIG. 10 illustrates an exemplary system using a digital image capturing device, in accordance with an embodiment of the present invention. The system using a digital image capturing device 1000 comprises at least a digital image capturing device 1010. The digital image capturing device 1010 is directed to a scene 1012 for capturing an image of the scene 1012 by a user (not shown in figure). The scene 1012 is visible in the display 1016 on side 1014 of the digital image capturing device 1010. The scene 1012 is visible as a view 1018 in the display 1016. In one exemplary embodiment, the digital image capturing device 1010 is capable of providing the user with a user interface to force lock a particular region in scene 1012 using a computer program in a computing system/microcontroller housed in the device. The force locked object 1020 (a tree in FIG. 7) is marked 1022 with a rectangle around the object as seen in view 1018. The user is provided 1024 with a selection option 1028 as seen in view 1026 of the display 1016. Once the user selects one of the options from 1028 (XXX) the user is provided a further set of detailed options 1030 (XX) on the display 1016 as seen in view 1026. The selection options 1028 and detailed options 1030 are provided in close proximity to mark 1022. The selection options 1028 and detailed options 1030 are provided using a computer program in a computing system housed in the device. For example, as shown in FIG. 10, the user selects multiple option, for example, (i) to include a shadow around the tree and (ii) to crop the tree to a star shaped design. The user selects an option 1030 in the region of the force lock 1022. As a result, 1032 in view 1034 seen in display 1016 a visual of a tree 1036 cropped with a star shape and having a shadow is viewable in the adjusted object image 1038 compared to a tree 1020 in the unadjusted image.

Figure 11:
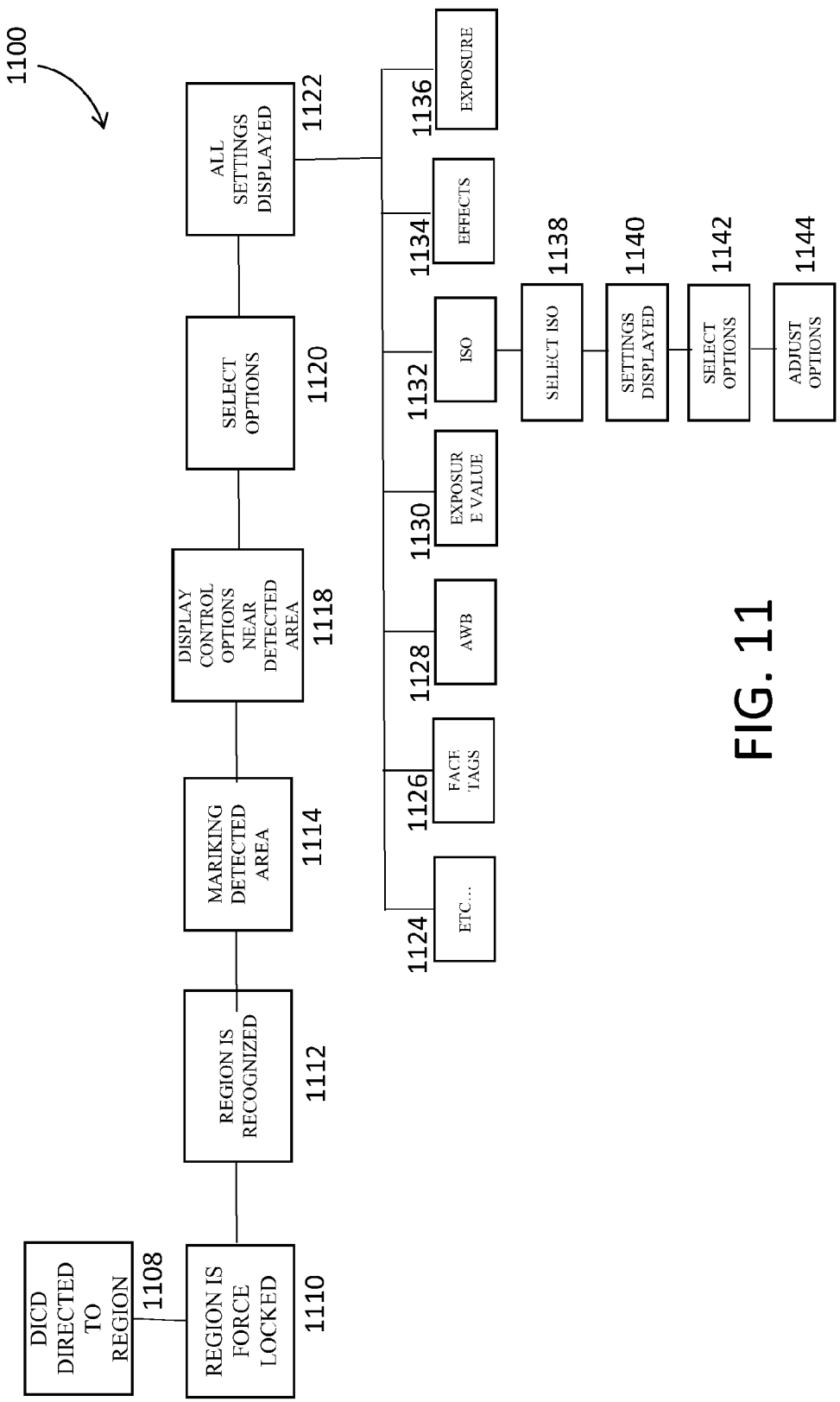
FIG. 11 is a block diagram illustrating an exemplary system for providing an adjusted image using a digital image capturing devices, in accordance with an embodiment of the present invention.

FIG. 11 is a block diagram illustrating an exemplary system for providing an adjusted image using a digital image capturing devices, in accordance with an embodiment of the present invention. During a typical operation of the system 1100, a digital image capturing device (DICD) 1108 is directed by a user (not shown in figure) to an image (not shown in figure). The image is captured by an image capturing module in the digital image capturing device. A processor (not shown in figure) then works on processing and analyzing the image using various sensors (not shown in figure). A region/object is force locked 1110 by the user. A force lock recognition module 1112 then works on the processed and analyzed image. In one embodiment, the force lock recognition module may be triggered by a user using a software algorithm displayed on the display in the digital image capturing device when the digital image capturing device is directed to a scene for capturing an image of the scene after capturing an image of the scene. In another embodiment, the force lock recognition module may be triggered by the user using a hardware in the digital image capturing device when the digital image capturing device is directed to a scene for capturing an image of the scene. Once the image is processed, analyzed and the areas containing the objects/regions are force locked and recognized, the objects/regions are identified by marking the detected area containing the objects/regions 1114. It may be appreciated by a person with ordinary skill in the art, in light of and in accordance with the teachings of the present invention, that one or more methods of marking may be employed. The markings, without any limitation, may be done with an indicator of any shape or type circle, square, rectangle, bracket etc. . . . . The image with the markings is displayed on the display of the digital image capturing device.

The display of the digital image capturing device then displays the controls 1118 in proximity to the detected object. It may be appreciated by a person with ordinary skill in the art, in light of and in accordance with the teachings of the present invention, and as described hereinabove that the controls may be displayed automatically by the device based on a software algorithm or by user using a hardware on the device that triggers the software algorithm. The user may then select options 1120. It may be appreciated by a person with ordinary skill in the art, in light of and in accordance with the teachings of the present invention, and as described hereinabove that the user may select options 1120 either by using the user interface provided on the display automatically by the device based on a software algorithm or by using hardware on the device. All available camera settings are displayed 1122 on the screen, for example, exposure 1136, effects 1134, ISO (image sensor sensitivity) 1132, exposure value 1130, AWB (auto white balance) 1128, face tags 1126, etc. . . . 1124. On selecting 1138 one of the settings say ISO 1132, the user is provided with a display 1140 of the next level of settings, the user may then select 1142 from the various options available under ISO 1132, and then use one or more options to adjust 1144 the object on the display of the device as described with reference to FIG. 10.

Figure 12:
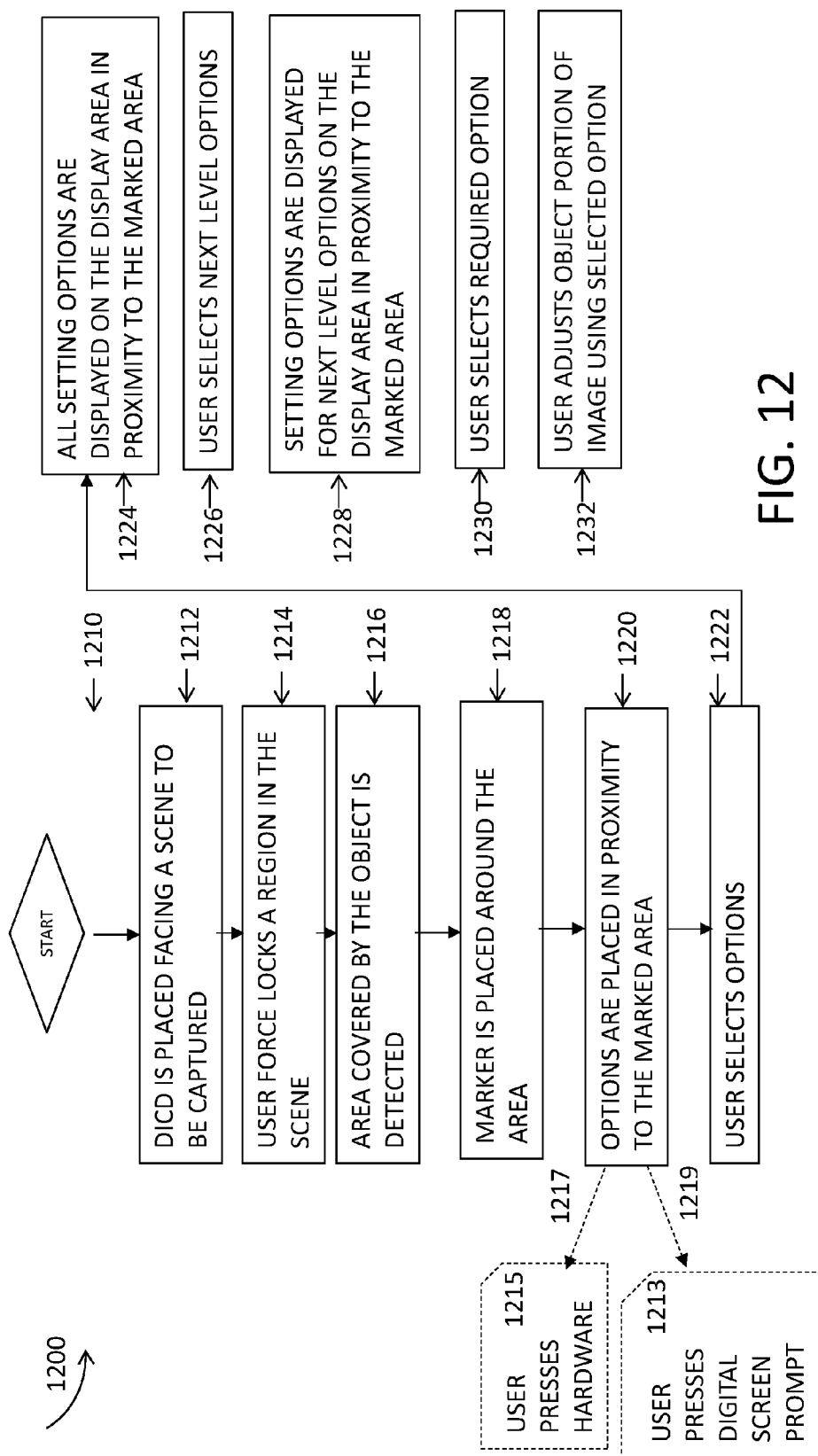
FIG. 12 is a flow chart illustrating an exemplary process for providing an adjusted image using a digital image capturing device, in accordance with an embodiment of the present invention.

FIG. 12 is a flow chart illustrating an exemplary process for providing an adjusted image using a digital image capturing device, in accordance with an embodiment of the present invention. After the start step 1210 a user places a digital image capturing device facing a scene/image to be captured in step 1212. The digital image capturing device is enabled to allow the user to force lock a region in the scene using a computer program. The area in the image covered by the force locked region is detected in step 1216. In step 1218 a marker is placed around the area as described hereinabove. In step 1220 a designated computer program provides a user interface on the display of the digital image capturing device that provides the user selection options that are placed in proximity to the marked area. The user either presses 1217 hardware 1215 or presses 1219 digital screen prompt 1213 to select the options. In step 1222 the user selects the options. In step 1224 all setting options are displayed on the display screen in proximity to the marked area as shown with reference to FIG. 11, for example, exposure 1136, effects 1134, ISO (image sensor sensitivity) 1132, exposure value 1130, AWB (auto white balance) 1128, face tags 1126, etc. . . . 1124 in proximity to the marked area. In step 1226 the user selects the next level of options, for example, options under ISO 1132. In step 1228, the user is provided with a display of options of the next level of settings, again in proximity to the marked area. In step 1230 the user may select the required option, and then use one or more options to adjust 1144 the face on the display of the device as described with reference to FIG. 10. In step 1232, for example, as shown in FIG. 10 the user selects an option to crop the tree in the shape of a star and add a shadow in region 1022 on the selected object 1020 and adjusts the tree portion is adjusted accordingly.

It may be appreciated by a person with ordinary skill in the art, in light of and in accordance with the teachings of the present invention, that virtually any additional steps may be added to the digital image capture process 1200. Additional steps may include, but not limited to, additional data gathering, sending messages to other devices, and accessing additional resources. In an alternative embodiment of the present invention, the digital image capture process 1200 may include suggesting recommended image adjustments to a user before and/or after a user captures an image. As mentioned hereinabove, in various embodiments, the image adjustments suggested to the user may include the functionalities available in the digital image capture device being used by the user, for example, mobile phone, laptop, notebook, etc. . . . .

It may be appreciated by a person with ordinary skill in the art, in light of and in accordance with the teachings of the present invention, that one or more steps in the digital image capture process 1200 may be added, removed, or rearranged. In some embodiments of the present invention, the digital image capture process 1200 may omit the steps of. In other embodiments of the present invention, the order of steps in the digital image capture process 1200 may occur in any order. In still other embodiments of the present invention, additional steps may be added to the digital image capture process 1200.

Figure 13:
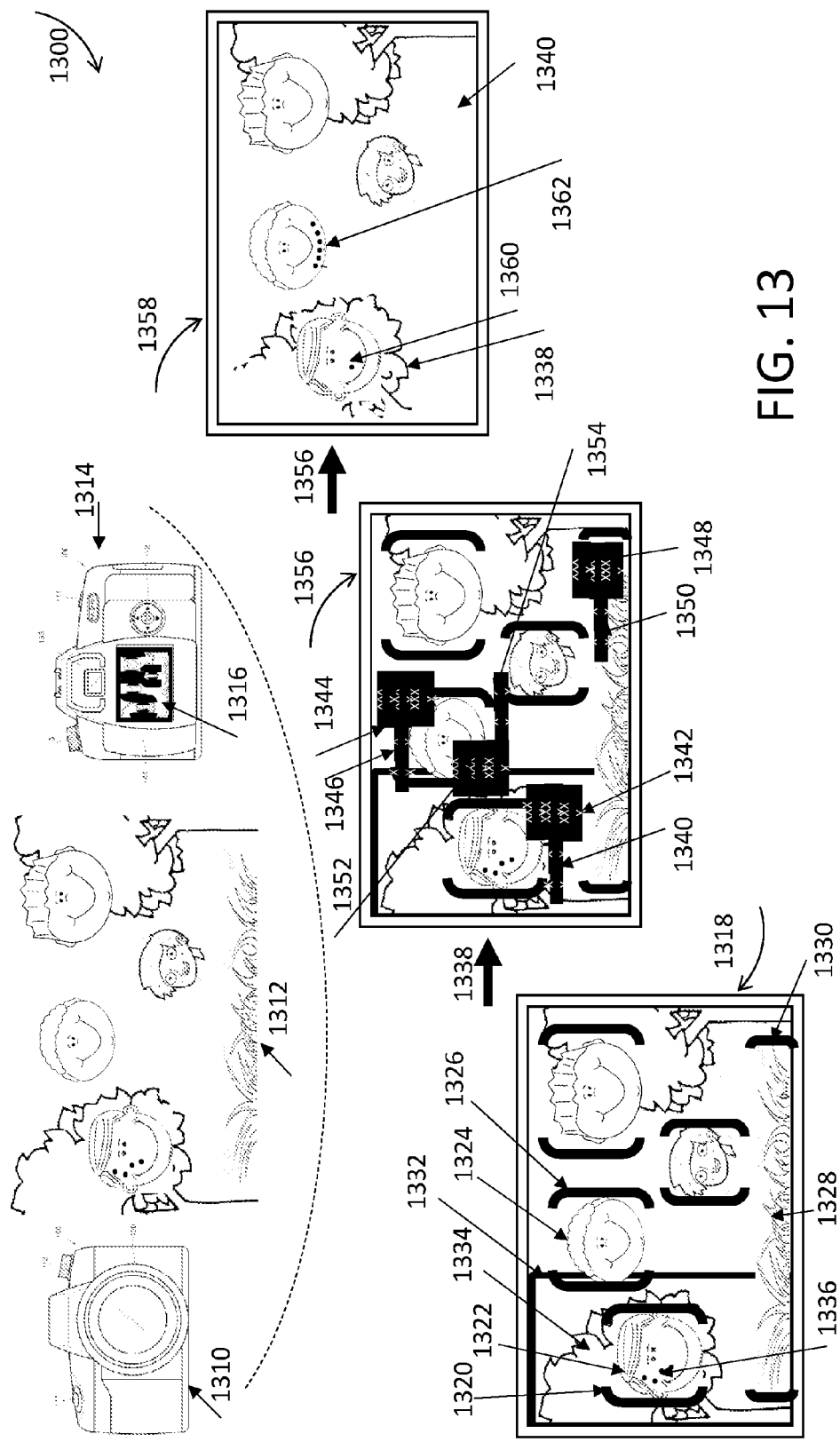
FIG. 13 illustrates an exemplary system using a digital image capturing device, in accordance with an embodiment of the present invention.

FIG. 13 illustrates an exemplary system using a digital image capturing device, in accordance with an embodiment of the present invention. The system using a digital image capturing device 1300 comprises at least a digital image capturing device 1310. The digital image capturing device 1310 is directed to a scene 1312 for capturing an image of the scene 1312 by a user (not shown in figure). The scene 1312 is visible in the display 1316 on side 1314 of the digital image capturing device 1310. The scene 1312 is visible as a view 1318 in the display 1316. In one exemplary embodiment, the digital image capturing device 1310 is capable of recognizing a plurality of regions in scene, i.e., faces, objects, and allowing the user to force lock regions in scene 1312 using a computer program in a computing system/microcontroller housed in the device. The face 1322 is marked 1320 with a bracket around the face, the face 1324 is marked 1326 with a bracket around the face, the object 1328 (grass) is marked with a bracket 1330, and a force lock 1332 is fixed on the region covering a tree 1334 by the user, as seen in view 1318. The face 1322 has a few black spots 1336. The face 1324 is clean. The user is provided 1338 with a selection option independently in the proximity of each of plurality of regions i.e., the face 1322 option 1342, of the face 1324 option 1344, of the object 1328 option 1348, and of the force lock region 1332 option 1352 as seen in view 1338 of the display 1316. Once the user selects one of the options from 1342, 1344, 1348, and 1352 (XXX) for the different marked regions in scene 1312 the user is provided a further set of detailed options in the proximity of the face 1322 option 1340, of the face 1324 option 1346, of the object 1328 option 1350, and of the force lock region 1332 option 1354 as seen in view 1338 of the display 1316 (XX). The selection options and detailed options are provided using a computer program in a computing system housed in the device. For example, as shown in FIG. 13, the user selects multiple options, (i) in face 1322 the user selects an option to minimize the dark spots i.e., may be introduce a lightening effect; as a result, 1356 in view 1358 seen in display 1316 only one spot 1360 is viewable in the adjusted face image compared to multiple spots 1336 in the unadjusted face image 1322; (ii) in the face 1324 the user selects an option to increase the grain size i.e., may be introduce a darkening effect on the face, as a result, 1356 in view 1358 seen in display 1316 a visual of a beard 1362 is viewable in the adjusted face image compared to a clean face in the unadjusted face image 1324; (iii) the user selects an option to delete the object 1328; as a result, 1356 in view 1358 seen in display 1316 is a visual of a blank space 1340 in place of object 1328; and (iv) The user selects an option (a) to include a shadow around the tree and (ii) to crop the tree to a star shaped design, as a result, 1356 in view 1358 seen in display 1316 a visual of a tree 1338 cropped with a star shape and having a shadow is viewable in the adjusted object image compared to a tree 1334 in the unadjusted image.

Figure 14:
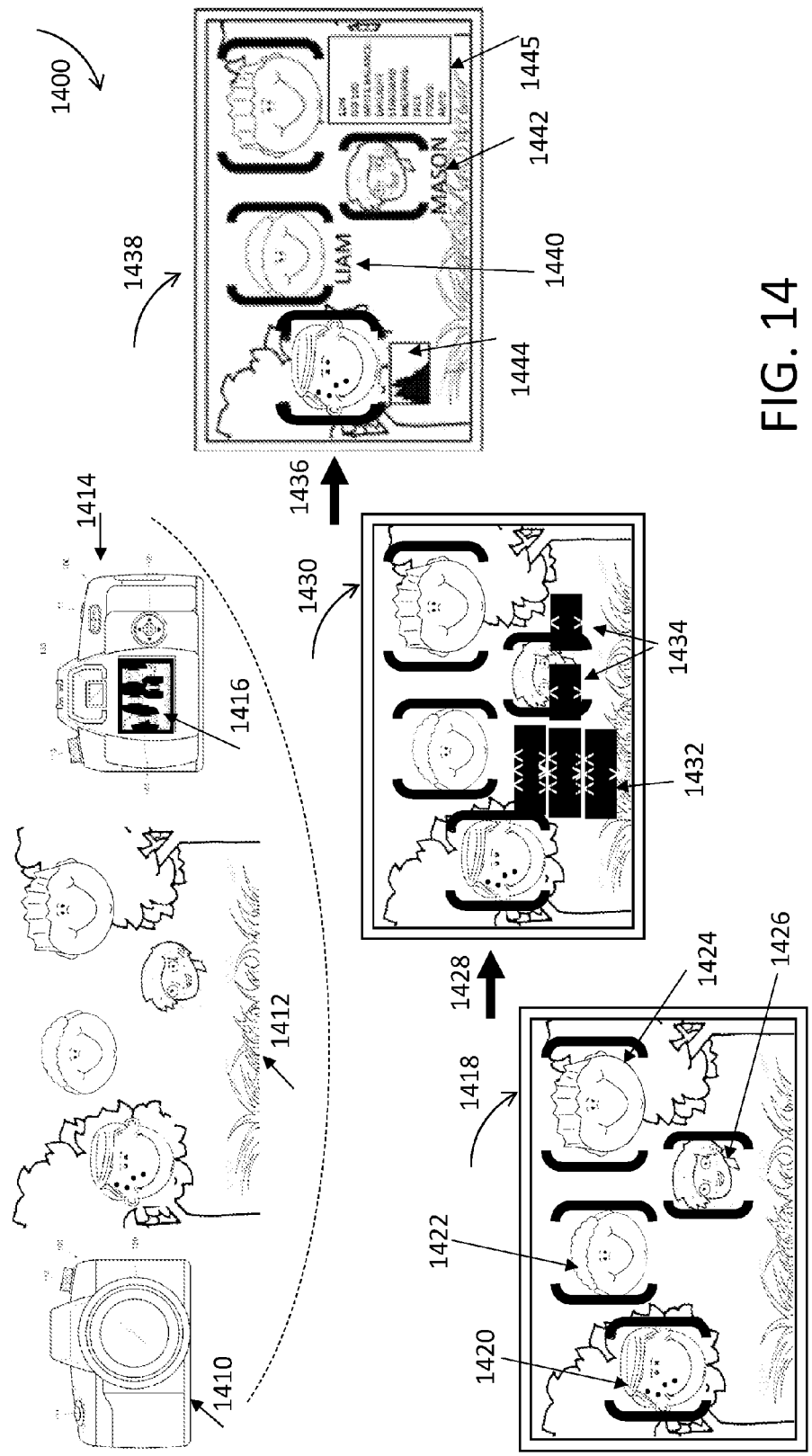
FIG. 14 illustrates an exemplary system using a digital image capturing device, in accordance with an embodiment of the present invention.

FIG. 14 illustrates an exemplary system using a digital image capturing device, in accordance with an embodiment of the present invention. The system using a digital image capturing device 1400 comprises at least a digital image capturing device. The digital image capturing device 1410 is directed to a scene 1412 for capturing an image of the scene 1412 by a user (not shown in figure). The scene 1412 is visible in the display 1416 on side 1414 of the digital image capturing device 1410. The scene 1412 is visible as a view 1418 in the display 1416. In one exemplary embodiment, the digital image capturing device 1410 is capable of recognizing faces in scene 1412 using a computer program in a computing system/microcontroller housed in the device. The faces 1420, 1422, 1424, and 1426 are marked with a brackets around the face as seen in view 1418. The information of each of the faces 1420, 1422, 1424, and 1426 is available in the database (not shown in figure) in the digital image capturing device or with in any other data storing device (not shown in figure) that is in communication with the digital image capturing device. The user is provided 1428 with a selection option 1432 as seen in view 1430 of the display 1416. Once the user selects one of the options from 1432 (XXX) the user is provided a further set of detailed options 1434 (XX) on the display 1416 as seen in view 1430. The selection options 1432 and detailed options 1434 are provided in close proximity to brackets marking the faces. The selection options 1432 and detailed options 1434 are provided using a computer program in a computing system housed in the device. For example, as shown in FIG. 14, the user selects an option to show the information about the face to identify name of a person. As a result, 1436 in view 1438 seen in display 1416 a visual of a name is viewable next to the brackets of faces, i.e., face 1422, Liam 1440; face 1426, Mason 1442; and a histogram 1444 of the details of the face 1420; and information display 1445 of the details of Face 1424.

Figure 15:
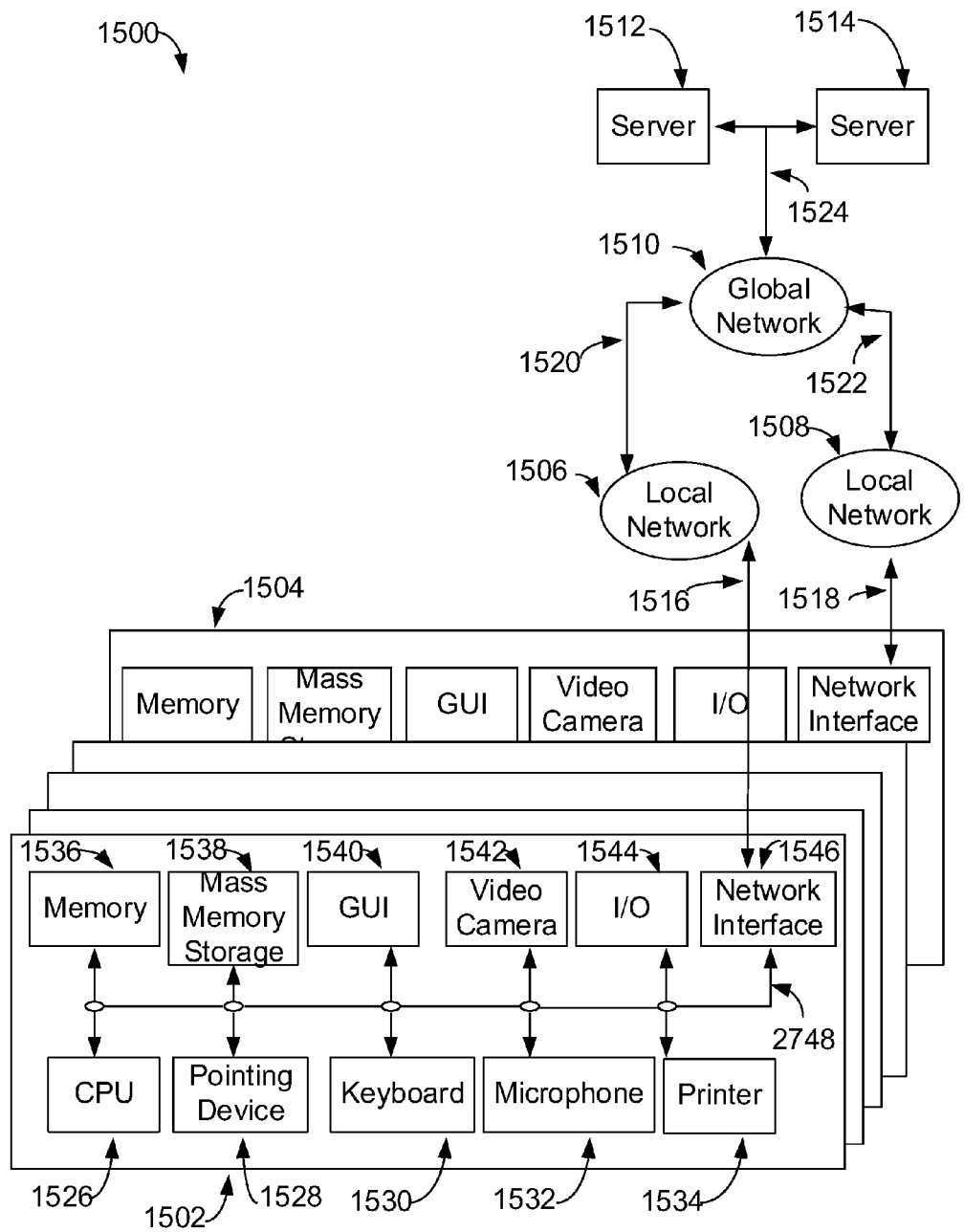
FIG. 15 is a block diagram depicting an exemplary client/server system which may be used by an exemplary web-enabled/networked embodiment of the present invention.

FIG. 15 is a block diagram depicting an exemplary client/server system which may be used by an exemplary web-enabled/networked embodiment of the present invention.

A communication system 1500 includes a multiplicity of clients with a sampling of clients denoted as a client 1502 and a client 1504, a multiplicity of local networks with a sampling of networks denoted as a local network 1506 and a local network 1508, a global network 1510 and a multiplicity of servers with a sampling of servers denoted as a server 1512 and a server 1514.

Client 1502 may communicate bi-directionally with local network 1506 via a communication channel 1516. Client 1504 may communicate bi-directionally with local network 1508 via a communication channel 1518. Local network 1506 may communicate bi-directionally with global network 1510 via a communication channel 1520. Local network 1508 may communicate bi-directionally with global network 1510 via a communication channel 1522. Global network 1510 may communicate bi-directionally with server 1512 and server 1514 via a communication channel 1524. Server 1512 and server 1514 may communicate bi-directionally with each other via communication channel 1524. Furthermore, clients 1502, 1504, local networks 1506, 1508, global network 1510 and servers 1512, 1514 may each communicate bi-directionally with each other.

In one embodiment, global network 1510 may operate as the Internet. It will be understood by those skilled in the art that communication system 1500 may take many different forms. Non-limiting examples of forms for communication system 1500 include local area networks (LANs), wide area networks (WANs), wired telephone networks, wireless networks, or any other network supporting data communication between respective entities.

Clients 1502 and 1504 may take many different forms. Non-limiting examples of clients 1502 and 1504 include personal computers, personal digital assistants (PDAs), cellular phones and smartphones.

Client 1502 includes a CPU 1526, a pointing device 1528, a keyboard 1530, a microphone 1532, a printer 1534, a memory 1536, a mass memory storage 1538, a GUI 1540, a video camera 1542, an input/output interface 1544 and a network interface 1546.

CPU 1526, pointing device 1528, keyboard 1530, microphone 1532, printer 1534, memory 1536, mass memory storage 1538, GUI 1540, video camera 1542, input/output interface 1544 and network interface 1546 may communicate in a unidirectional manner or a bi-directional manner with each other via a communication channel 1548. Communication channel 1548 may be configured as a single communication channel or a multiplicity of communication channels.

CPU 1526 may be comprised of a single processor or multiple processors. CPU 1526 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1536 is used typically to transfer data and instructions to CPU 1526 in a bi-directional manner. Memory 1536, as discussed previously, may include any suitable computer-readable media, intended for data storage, such as those described above excluding any wired or wireless transmissions unless specifically noted. Mass memory storage 1538 may also be coupled bi-directionally to CPU 1526 and provides additional data storage capacity and may include any of the computer-readable media described above. Mass memory storage 1538 may be used to store programs, data and the like and is typically a secondary storage medium such as a hard disk. It will be appreciated that the information retained within mass memory storage 1538, may, in appropriate cases, be incorporated in standard fashion as part of memory 1536 as virtual memory.

CPU 1526 may be coupled to GUI 1540. GUI 1540 enables a user to view the operation of computer operating system and software. CPU 1526 may be coupled to pointing device 1528. Non-limiting examples of pointing device 1528 include computer mouse, trackball and touchpad. Pointing device 1528 enables a user with the capability to maneuver a computer cursor about the viewing area of GUI 1540 and select areas or features in the viewing area of GUI 1540. CPU 1526 may be coupled to keyboard 1530. Keyboard 1530 enables a user with the capability to input alphanumeric textual information to CPU 1526. CPU 1526 may be coupled to microphone 1532. Microphone 1532 enables audio produced by a user to be recorded, processed and communicated by CPU 1526. CPU 1526 may be connected to printer 1534. Printer 1534 enables a user with the capability to print information to a sheet of paper. CPU 1526 may be connected to video camera 1542. Video camera 1542 enables video produced or captured by user to be recorded, processed and communicated by CPU 1526.

CPU 1526 may also be coupled to input/output interface 1544 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1526 optionally may be coupled to network interface 1546 which enables communication with an external device such as a database or a computer or telecommunications or internet network using an external connection shown generally as communication channel 1516, which may be implemented as a hardwired or wireless communications link using suitable conventional technologies. With such a connection, CPU 1526 might receive information from the network, or might output information to a network in the course of performing the method steps described in the teachings of the present invention.

Figure 16:
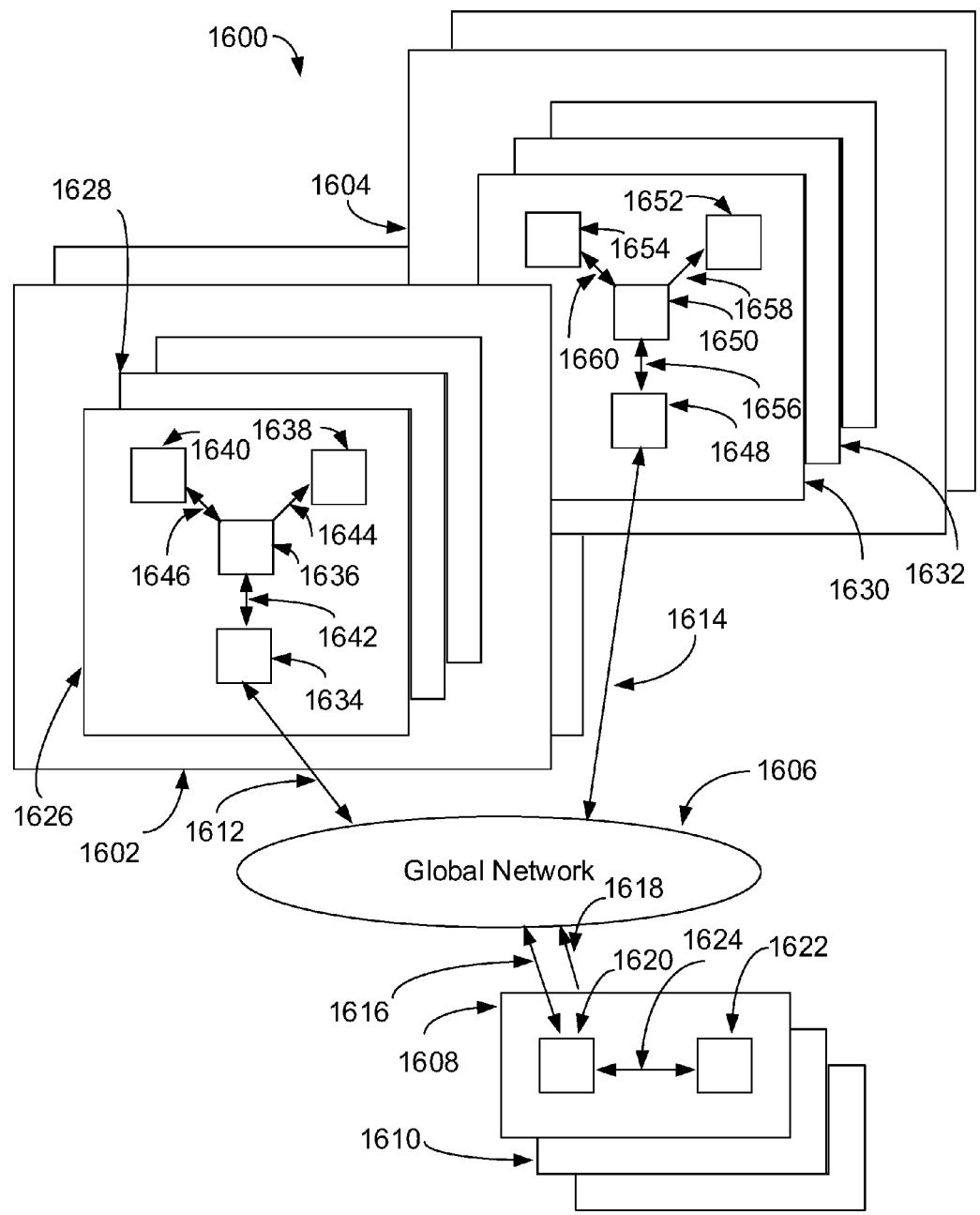
FIG. 16 illustrates a block diagram depicting a conventional client/server communication system.

FIG. 16 illustrates a block diagram depicting a conventional client/server communication system.

A communication system 1600 includes a multiplicity of networked regions with a sampling of regions denoted as a network region 1602 and a network region 1604, a global network 1606 and a multiplicity of servers with a sampling of servers denoted as a server device 1608 and a server device 1610.

Network region 1602 and network region 1604 may operate to represent a network contained within a geographical area or region. Non-limiting examples of representations for the geographical areas for the networked regions may include postal zip codes, telephone area codes, states, counties, cities and countries. Elements within network region 1602 and 1604 may operate to communicate with external elements within other networked regions or within elements contained within the same network region.

In some implementations, global network 1606 may operate as the Internet. It will be understood by those skilled in the art that communication system 1600 may take many different forms. Non-limiting examples of forms for communication system 1600 include local area networks (LANs), wide area networks (WANs), wired telephone networks, cellular telephone networks or any other network supporting data communication between respective entities via hardwired or wireless communication networks. Global network 1606 may operate to transfer information between the various networked elements.

Server device 1608 and server device 1610 may operate to execute software instructions, store information, support database operations and communicate with other networked elements. Non-limiting examples of software and scripting languages which may be executed on server device 1608 and server device 1610 include C, C++, C# and Java.

Network region 1602 may operate to communicate bi-directionally with global network 1606 via a communication channel 1612. Network region 1604 may operate to communicate bi-directionally with global network 1606 via a communication channel 1614. Server device 1608 may operate to communicate bi-directionally with global network 1606 via a communication channel 1616. Server device 1610 may operate to communicate bi-directionally with global network 1606 via a communication channel 1618. Network region 1602 and 1604, global network 1606 and server devices 1608 and 1610 may operate to communicate with each other and with every other networked device located within communication system 1600.

Server device 1608 includes a networking device 1620 and a server 1622. Networking device 1620 may operate to communicate bi-directionally with global network 1606 via communication channel 1616 and with server 1622 via a communication channel 1624. Server 1622 may operate to execute software instructions and store information.

Network region 1602 includes a multiplicity of clients with a sampling denoted as a client 1626 and a client 1628. Client 1626 includes a networking device 1634, a processor 1636, a GUI 1638 and an interface device 1640. Non-limiting examples of devices for GUI 1638 include monitors, televisions, cellular telephones, smartphones and PDAs (Personal Digital Assistants). Non-limiting examples of interface device 1640 include pointing device, mouse, trackball, scanner and printer. Networking device 1634 may communicate bi-directionally with global network 1606 via communication channel 1612 and with processor 1636 via a communication channel 1642. GUI 1638 may receive information from processor 1636 via a communication channel 1644 for presentation to a user for viewing. Interface device 1640 may operate to send control information to processor 1636 and to receive information from processor 1636 via a communication channel 1646. Network region 1604 includes a multiplicity of clients with a sampling denoted as a client 1630 and a client 1632. Client 1630 includes a networking device 1648, a processor 1650, a GUI 1652 and an interface device 1654. Non-limiting examples of devices for GUI 1638 include monitors, televisions, cellular telephones, smartphones and PDAs (Personal Digital Assistants). Non-limiting examples of interface device 1640 include pointing devices, mousse, trackballs, scanners and printers. Networking device 1648 may communicate bi-directionally with global network 1606 via communication channel 1614 and with processor 1650 via a communication channel 1656. GUI 1652 may receive information from processor 1650 via a communication channel 1658 for presentation to a user for viewing. Interface device 1654 may operate to send control information to processor 1650 and to receive information from processor 1650 via a communication channel 1660.

For example, consider the case where a user interfacing with client 1626 may want to execute a networked application. A user may enter the IP (Internet Protocol) address for the networked application using interface device 1640. The IP address information may be communicated to processor 1636 via communication channel 1646. Processor 1636 may then communicate the IP address information to networking device 1634 via communication channel 1642. Networking device 1634 may then communicate the IP address information to global network 1606 via communication channel 1612. Global network 1606 may then communicate the IP address information to networking device 1620 of server device 1608 via communication channel 1616. Networking device 1620 may then communicate the IP address information to server 1622 via communication channel 1624. Server 1622 may receive the IP address information and after processing the IP address information may communicate return information to networking device 1620 via communication channel 1624. Networking device 1620 may communicate the return information to global network 1606 via communication channel 1614. Global network 1606 may communicate the return information to networking device 1634 via communication channel 1612. Networking device 1634 may communicate the return information to processor 1636 via communication channel 1642. Processor 1646 may communicate the return information to GUI 1648 via communication channel 1644. User may then view the return information on GUI 1638.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §142 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §142 (6). In some embodiments, the methods and/or system components which may be located and/or performed remotely include, without limitation databases or image storage.

It is noted that according to USA law, all claims must be set forth as a coherent, cooperating set of limitations that work in functional combination to achieve a useful result as a whole. Accordingly, for any claim having functional limitations interpreted under 35 USC §142 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §142 (6) is/(are) dependent on one or more remote servers located outside the USA, it is intended that each such recited function under 35 USC §142 (6) is to be interpreted as the function of the local system receiving the remotely generated information required by a locally implemented claim limitation, wherein the structures and or steps which enable, and breath life into the expression of such functions claimed under 35 USC §142 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §142 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §142 (1), all claims must be supported by sufficient disclosure in the present patent specification, and any material known to those skilled in the art need not be explicitly disclosed. However, 35 USC §142 (6) requires that structures corresponding to functional limitations interpreted under 35 USC §142 (6) must be explicitly disclosed in the patent specification. Moreover, the USPTO's Examination policy of initially treating and searching prior art under the broadest interpretation of a "mean for" claim limitation implies that the broadest initial search on 142(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §142 (6) when such corresponding structures are not explicitly disclosed in the foregoing patent specification. Therefore, for any invention element(s)/structure(s) corresponding to functional claim limitation(s), in the below claims interpreted under 35 USC §142 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §142 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §142 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §142 (6). Applicant(s) note that all the identified documents above which are incorporated by reference to satisfy 35 USC §142 (6) necessarily have a filing and/or publication date prior to that of the instant application, and thus are valid prior documents to incorporated by reference in the instant application.

Having fully described at least one embodiment of the present invention, other equivalent or alternative methods of implementing image capture using the digital image capture device according to the present invention will be apparent to those skilled in the art. Various aspects of the invention have been described above by way of illustration, and the specific embodiments disclosed are not intended to limit the invention to the particular forms disclosed. The particular implementation of image capture using the digital image capture device may vary depending upon the particular context or application. By way of example, and not limitation, image capture using the digital image capture device described in the foregoing were principally directed to capturing and adjusting/enhancing images for capture memories, sharing with social circle, for security, and/or legal investigation purposes, for number recognition, for biometrics, for facial biometrics, social recognition, hand gesture recognition, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
a digital image capturing device configured to enable a user to capture and adjust an image of a scene, wherein the digital image capturing device comprises:
an image capture module configured to capture a digital image of the image of the scene;
a display unit configured to display the image of the scene;
a recognition module configured to recognize and detect a plurality of regions in the image of the scene;
a microcontroller configured to identify the plurality of regions recognized by the recognition module in the image of the scene displayed in the display unit;
a settings selection module and an area specific section user interface module configured to provide a user with device setting options available for the digital image capturing device, wherein the device setting options are provided in the display unit in close proximity and independently to each region of the identified plurality of regions in the image of the scene displayed in the display unit; and
a settings adjustment module and an area specific adjustment user interface module configured to enable the user to select a setting option from the device setting options provided in the display unit in close proximity to the identified plurality of regions in the image of the scene displayed in the display unit, wherein the area specific adjustment user interface is configured to enable the user to make the adjustments based on a selected device setting option.

2. The system of claim 1, wherein the recognition module comprises a face recognition module, an object recognition module, an virtual reality generation module, an object character recognition module, an biometrics module, an facial biometrics module, an hand gesture recognition module, an social recognition module, an voice/speech recognition module, an thermal recognition module, an iris recognition module, an license plate recognition module, an activity recognition module, an pattern recognition module, an handwriting recognition module, an feature extraction recognition, an object tracking recognition, and force lock module.

3. The system of claim 2, wherein the face recognition module, the object recognition module, the virtual reality generation module, the object character recognition module, the biometrics module, the facial biometrics module, the hand gesture recognition module, the social recognition module, the voice/speech recognition module, the thermal recognition module, the iris recognition module, the license plate recognition module, the activity recognition module, the pattern recognition module, the handwriting recognition module, the feature extraction recognition, the object tracking recognition, and alike recognition modules are automatic functions of the digital image capturing device.

4. The system of claim 2, wherein the force lock module is configured to enable the user to force lock a region or object in the image of the scene displayed in the display unit.

5. The system of claim 1, wherein the digital image capturing device comprises a digital camera, a mobile phone, a laptop, and a computer.

6. The system of claim 1, wherein the display unit is an integral part of the digital image capturing device.

7. The system of claim 1, wherein the display unit is located in a remote device, wherein the configured to provide the user with the selection options using a settings selection module and an area specific section user interface module, and wherein the user is enabled to make adjustments to the image in the remote device using a settings adjustment module and an area specific adjustment user interface module, and wherein the system is configured to be operable to send the region picture or picture to a printer.

8. The system of claim 1, wherein the selection options comprise all the options provided by the digital image capturing device.

9. The system of claim 8, wherein multiple levels of selection options are provided by the digital image capturing device.

10. The system of claim 8, wherein the selection options comprise exposure, effects, ISO, AWB, exposure value, face tags, copy, add tag, crop, detect text, set as, print, social share, location tags, and information on the identified region.

11. The system of claim 9, wherein the information on the identified region comprises name of a person in the image, histogram containing details of the person in the image, and information display containing information about the region.

12. The system of claim 1, wherein the digital image capturing device is configured to enable the user to make independent adjustments to each of the plurality of the regions in one image of the scene.

13. The system of claim 1, wherein the microcontroller is configured to identify each of the plurality of regions recognized by the recognition modules in the image of the scene displayed in the display unit using a marking.

14. The system of claim 13, wherein the markings in a scene, without any limitation, may be displayed with an indicator of any shape, any type circle, any type square, any type rectangle, any type bracket, and are triggered by at least one of auto function software algorithm of the digital image capturing device, the user using a hardware in the digital image capturing device, the user using the digital screen in the digital image capturing device.

15. The system of claim 1, wherein device setting options controls marking in the display unit in close proximity and independently to each region of the identified plurality of regions in the image of the scene are triggered by at least one of auto function software algorithm of the digital image capturing device, the user using a hardware in the digital image capturing device, the user using the digital screen in the digital image capturing device.

16. The system of claim 1, wherein each of the plurality of regions recognized by the recognition modules in the image of the scene displayed could be adjusted by using a hardware in the digital image capturing device or a digital screen in the digital image capturing device or by auto function software algorithm of the digital image capturing device.

17. The system of claim 1, wherein the settings adjustment module and an area specific adjustment user interface module could be provided in any region of the display unit.

18. A method comprising the steps of:
capturing an image of a scene using a digital image capturing device; displaying the image of the scene on a display unit;
recognizing a plurality of regions in the image of the scene, using a recognition module in the digital image capturing device;
identifying the plurality of regions in the image of the scene, using a microcontroller in the digital image capturing device;
providing device setting options in the display unit in close proximity and independently to each region of the identified plurality of regions using a setting selection module and an area specific user interface module;
enabling the user to make adjustments to the image in the display unit using a settings adjustment module and an area specific adjustment user interface module;
and displaying in the display unit an adjusted image with at least one adjustment made in the image of the scene.

19. A non-transitory computer-readable storage medium with an executable program stored thereon, wherein the program instructs one or more processors to perform the following steps:
capturing an image of a scene using a digital image capturing device;
displaying the image of the scene on a display unit;
recognizing a plurality of regions in the image of the scene, using a recognition module in the digital image capturing device;
identifying the plurality of regions in the image of the scene, using a microcontroller in the digital image capturing device;
providing device setting options in the display unit in close proximity and independently to each region of the identified plurality of regions using a setting selection module and an area specific user interface module;
enabling the user to make adjustments to the image in the display unit using a settings adjustment module and an area specific adjustment user interface module;
and displaying in the display unit an adjusted image with at least one adjustment made in the image of the scene.

\* \* \* \* \*